US012563466B2

(12) United States Patent
Ishii

(10) Patent No.: US 12,563,466 B2
(45) Date of Patent: Feb. 24, 2026

(54) NEIGHBORING CELL RELATIVE MOBILITY INFORMATION FOR VEHICLE MOUNTED RELAYS

(71) Applicant: SHARP KABUSHIKI KAISHA, Sakai (JP)

(72) Inventor: Atsushi Ishii, Vancouver, WA (US)

(73) Assignee: SHARP KABUSHIKI KAISHA, Sakai (JP)

( * ) Notice: Subject to any disclaimer, the term of this patent is extended or adjusted under 35 U.S.C. 154(b) by 306 days.

(21) Appl. No.: 18/275,427

(22) PCT Filed: Feb. 2, 2022

(86) PCT No.: PCT/JP2022/003966

§ 371 (c)(1),
(2) Date: Aug. 2, 2023

(87) PCT Pub. No.: WO2022/172822

PCT Pub. Date: Aug. 18, 2022

(65) Prior Publication Data

US 2024/0107404 A1     Mar. 28, 2024

Related U.S. Application Data

(60) Provisional application No. 63/147,446, filed on Feb. 9, 2021.

(51) Int. Cl.
*H04W 36/08* (2009.01)
*H04W 36/00* (2009.01)
(Continued)

(52) U.S. Cl.
CPC ....... *H04W 36/08* (2013.01); *H04W 36/0061* (2013.01); *H04W 36/0083* (2013.01); *H04W 36/324* (2023.05)

(58) Field of Classification Search
CPC ............. H04W 36/08; H04W 36/0061; H04W 36/0083; H04W 36/324; H04W 48/12;
(Continued)

(56) References Cited

U.S. PATENT DOCUMENTS 8,744,449 B2 * 6/2014 Song ................. H04W 36/0085
                                              455/437
9,374,773 B2 * 6/2016 Cui ........................ H04W 48/18
(Continued)

FOREIGN PATENT DOCUMENTS

CN        104796961 A    7/2015
EP        2708063 A1     3/2014
JP        4730565 B2     7/2011

OTHER PUBLICATIONS

Qualcomm Incorporated, "Use case on service continuity during mobility between mobile relays—user inside the vehicle", S1-204239, 3GPP TSG-SA WG1 Meeting #92e, Electronic Meeting, Nov. 10-19, 2020.
(Continued)

*Primary Examiner* — Jenee Holland
(74) *Attorney, Agent, or Firm* — ScienBiziP, P.C.

(57) ABSTRACT

A wireless terminal communicates with an access node via a serving cell and comprises receiver circuitry and processor circuitry. The receiver circuitry is configured to receive, from the serving cell, at least one message comprising: an identity of a neighboring cell, and; neighboring cell relative mobility information indicating mobility state of the neighboring cell relative to the serving cell. The processor circuitry is configured to perform a cell reselection procedure based on the neighboring cell relative mobility information.

15 Claims, 15 Drawing Sheets

(51) Int. Cl.

| | |
|---|---|
| *H04W 36/32* | (2009.01) |
| *H04W 48/12* | (2009.01) |
| *H04W 48/20* | (2009.01) |
| *H04W 84/00* | (2009.01) |
| *H04W 84/04* | (2009.01) |

(58) Field of Classification Search
CPC .. H04W 48/20; H04W 84/005; H04W 84/047
See application file for complete search history.

(56) References Cited

U.S. PATENT DOCUMENTS

| | | | | |
|---|---|---|---|---|
| 9,497,639 | B2 * | 11/2016 | Meshkati | H04W 52/244 |
| 9,924,439 | B2 | 3/2018 | Giloh | |
| 10,506,478 | B2 * | 12/2019 | Martin | H04W 36/0061 |
| 11,477,716 | B2 * | 10/2022 | Lee | H04W 36/328 |
| 11,510,215 | B2 * | 11/2022 | Tseng | H04B 17/318 |
| 2010/0069119 | A1 | 3/2010 | Mueck et al. | |
| 2011/0092237 | A1 | 4/2011 | Kato et al. | |
| 2013/0130689 | A1 * | 5/2013 | Cherian | H04W 48/16 |
| | | | | 455/436 |
| 2014/0045498 | A1 * | 2/2014 | Choi | H04W 36/324 |
| | | | | 455/436 |
| 2014/0247807 | A1 * | 9/2014 | Westerberg | H04W 36/34 |
| | | | | 370/331 |
| 2015/0358890 | A1 * | 12/2015 | Xu | H04W 48/04 |
| | | | | 455/437 |
| 2019/0313297 | A1 * | 10/2019 | Lee | H04W 36/0061 |
| 2020/0120564 | A1 * | 4/2020 | Liu | H04W 36/22 |
| 2021/0306840 | A1 * | 9/2021 | Abedini | H04W 64/006 |
| 2023/0268984 | A1 * | 8/2023 | Xu | H04W 48/20 |
| | | | | 375/262 |
| 2024/0107404 | A1 * | 3/2024 | Ishii | H04W 36/0061 |
| 2024/0276329 | A1 * | 8/2024 | Abedini | H04W 84/005 |

OTHER PUBLICATIONS

Qualcomm Incorporated, "Use case on service continuity during mobility between mobile relays—user outside the vehicle", S1-204238, 3GPP TSG-SA WG1 Meeting #92e, Electronic Meeting, Nov. 10-19, 2020.

Qualcomm Incorporated, "Use case on service continuity during mobility between macro and mobile relay—user entering/leaving vehicle", S1-204237, 3GPP TSG-SA WG1 Meeting #92e, Electronic Meeting, Nov. 10-19, 2020.

Qualcomm Incorporated, "Use case on service continuity during mobility between macro and mobile relay—user outside the vehicle", S1-204236, 3GPP TSG-SA WG1 Meeting #92e, Electronic Meeting, Nov. 10-19, 2020.

Qualcomm Incorporated, "Use case on Control of UEs access via mobile relays using application-based subscription", S1-204235, 3GPP TSG-SA WG1 Meeting #92e, Electronic Meeting, Nov. 10-19, 2020.

Qualcomm Incorporated, "Use case on provisioning and control of UEs access via mobile relays", S1-204223, 3GPP TSG-SA WG1 Meeting #92e, Electronic Meeting, Nov. 10-19, 2020.

Qualcomm Incorporated, "Use case on basic support, configuration and control of vehicle relays", S1-204222, 3GPP TSG-SA WG1 Meeting #92e, Electronic Meeting, Nov. 10-19, 2020.

Qualcomm Incorporated, "TP for Overview section", S1-204221, 3GPP TSG-SA WG1 Meeting #92e, Electronic Meeting, Nov. 10-19, 2020.

Qualcomm Incorporated, "TR scope—text proposal", S1-204220, 3GPP TSG-SA WG1 Meeting #92e, Electronic Meeting, Nov. 10-19, 2020.

Xiaomi, "FS_VMR-Use Case-Provide Location service to a UE attached to the relay mounted in the vehicle", S1-204176, 3GPP TSG-SA WG1 Meeting #92e, Electronic Meeting, Nov. 10-19, 2020.

CATT, "Use case for authorization and configuration for car mounted base station", S1-204151, 3GPP TSG-SA WG1 Meeting #92e, Electronic Meeting, Nov. 10-19, 2020.

CATT, "Use case for continuous connection via bus mounted base station", S1-204150, 3GPP TSG-SA WG1 Meeting #92e, Electronic Meeting, Nov. 10-19, 2020.

CATT, "Use case for multiple working modes of vehicle mounted base station", S1-204149, 3GPP TSG-SA WG1 Meeting #92e, Electronic Meeting, Nov. 10-19, 2020.

LG Electronics et al., "Use Case: VMR load balancing", S1-204110, 3GPP TSG-SA WG1 Meeting #92-E, Electronic Meeting, Nov. 10-19, 2020.

LG Electronics et al., "Use Case: Optimizing mobility for UEs", S1-204109, 3GPP TSG-SA WG1 Meeting #92-E, Electronic Meeting, Nov. 10-19, 2020.

3GPP TS 38.331 V16.2.0 (Sep. 2020) 3rd Generation Partnership Project; Technical Specification Group Radio Access Network; NR; Radio Resource Control (RRC) protocol specification (Release 16).

3GPP TS 38.304 V16.2.0 (Sep. 2020) 3rd Generation Partnership Project; Technical Specification Group Radio Access Network; NR; User Equipment (UE) procedures in Idle mode and RRC Inactive state (Release 16).

3GPP TS 38.300 V16.4.0 (Dec. 2020) 3rd Generation Partnership Project; Technical Specification Group Radio Access Network; NR; NR and NG-RAN Overall Description; Stage 2 (Release 16).

3GPP TR 22.839 V0.0.0 (Nov. 2020) 3rd Generation Partnership Project; Technical Specification Group Services and System Aspects; Study on Vehicle-Mounted Relays; Stage 1 (Release 18).

Qualcomm Incorporated, "TP for Other considerations", S1-204243, 3GPP TSG-SA WG1 Meeting #92e, Electronic Meeting, Nov. 10-19, 2020.

Qualcomm Incorporated, "Use case on incentives and charging", S1-204242, 3GPP TSG-SA WG1 Meeting #92e, Electronic Meeting, Nov. 10-19, 2020.

Qualcomm Incorporated, "Use case on service continuity during mobility of relay between macro nodes—user inside the vehicle", S1-204241, 3GPP TSG-SA WG1 Meeting #92e, Electronic Meeting, Nov. 10-19, 2020.

Qualcomm Incorporated, "Use case on service continuity during mobility of relay between macro nodes—user outside the vehicle", S1-204240, 3GPP TSG-SA WG1 Meeting #92e, Electronic Meeting, Nov. 11-20, 2020.

* cited by examiner

RECEIVING, FROM A CELL, SERVING CELL MOBILITY INFORMATION — 5-1

DETERMINING, BASED ON THE SERVING CELL MOBILITY INFORMATION, MOBILITY STATE OF THE CELL — 5-2

GENERATING SERVING CELL MOBILITY INFORMATION — 6-1

TRANSMITTING, VIA A CELL SERVED BY THE ACCESS NODE, THE SERVING CELL MOBILITY INFORMATION — 6-2

100(7)

WIRELESS ACCESS NODE (DONOR)   424

NODE PROCESSOR(S)

CENTRAL UNIT (CU)   420

410   NEIGHBORING CELL MOBILITY INFORMATION GENERATOR

104a

DISTRIBUTED UNIT (DU)

422

426   427   TRANSCEIVER CIRCUITRY   428

TRANSMITTER CIRCUITRY   RECEIVER CIRCUITRY

112   MOBILE BASE STATION RELAY 110   402

406   NEIGHBORING CELL MOBILITY INFORMATION

279

UE   276   277   TRANSCEIVER CIRCUITRY

TRANSMITTER CIRCUITRY   278   RECEIVER CIRCUITRY

290

FRAME/MESSAGE HANDLER/GENERATOR   294

NEIGHBORING CELL MOBILITY STATE DETERMINATION CONTROLLER

116

430

NODE PROCESSOR(S)

RECEIVING, FROM A SERVING CELL, NEIGHBORING CELL MOBILITY INFORMATION    9-1

DETERMINING, BASED ON THE NEIGHBORING CELL MOBILITY INFORMATION, MOBILITY STATE OF THE NEIGHBORING CELL    9-2

GENERATING NEIGHBORING CELL MOBILITY INFORMATION    10-1

TRANSMITTING, TO A WIRELESS TERMINAL,  THE NEIGHBORING CELL MOBILITY INFORMATION    10-2

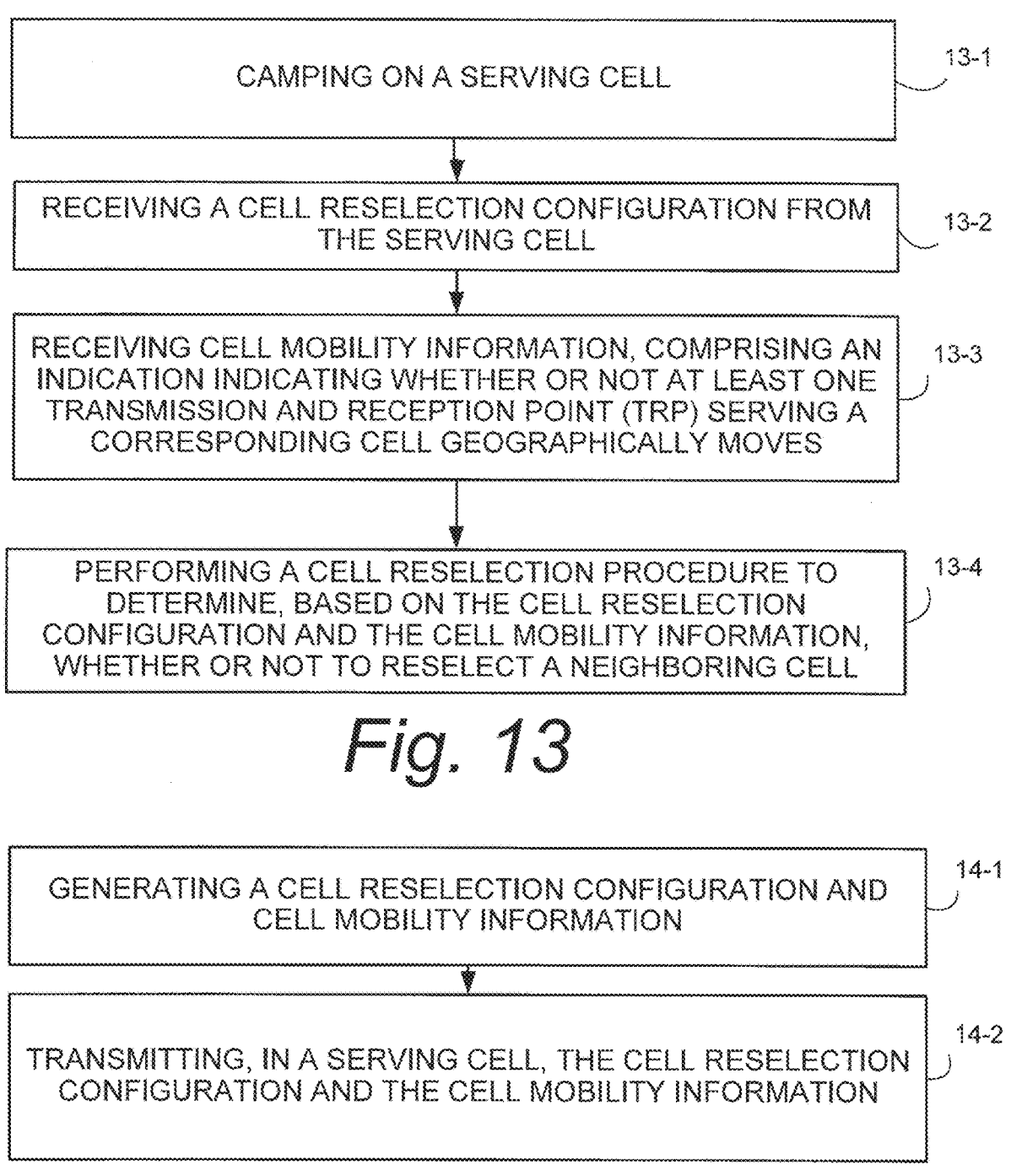

CAMPING ON A SERVING CELL — 13-1

RECEIVING A CELL RESELECTION CONFIGURATION FROM THE SERVING CELL — 13-2

RECEIVING CELL MOBILITY INFORMATION, COMPRISING AN INDICATION INDICATING WHETHER OR NOT AT LEAST ONE TRANSMISSION AND RECEPTION POINT (TRP) SERVING A CORRESPONDING CELL GEOGRAPHICALLY MOVES — 13-3

PERFORMING A CELL RESELECTION PROCEDURE TO DETERMINE, BASED ON THE CELL RESELECTION CONFIGURATION AND THE CELL MOBILITY INFORMATION, WHETHER OR NOT TO RESELECT A NEIGHBORING CELL — 13-4

*Fig. 13*

GENERATING A CELL RESELECTION CONFIGURATION AND CELL MOBILITY INFORMATION — 14-1

TRANSMITTING, IN A SERVING CELL, THE CELL RESELECTION CONFIGURATION AND THE CELL MOBILITY INFORMATION — 14-2

*Fig. 14*

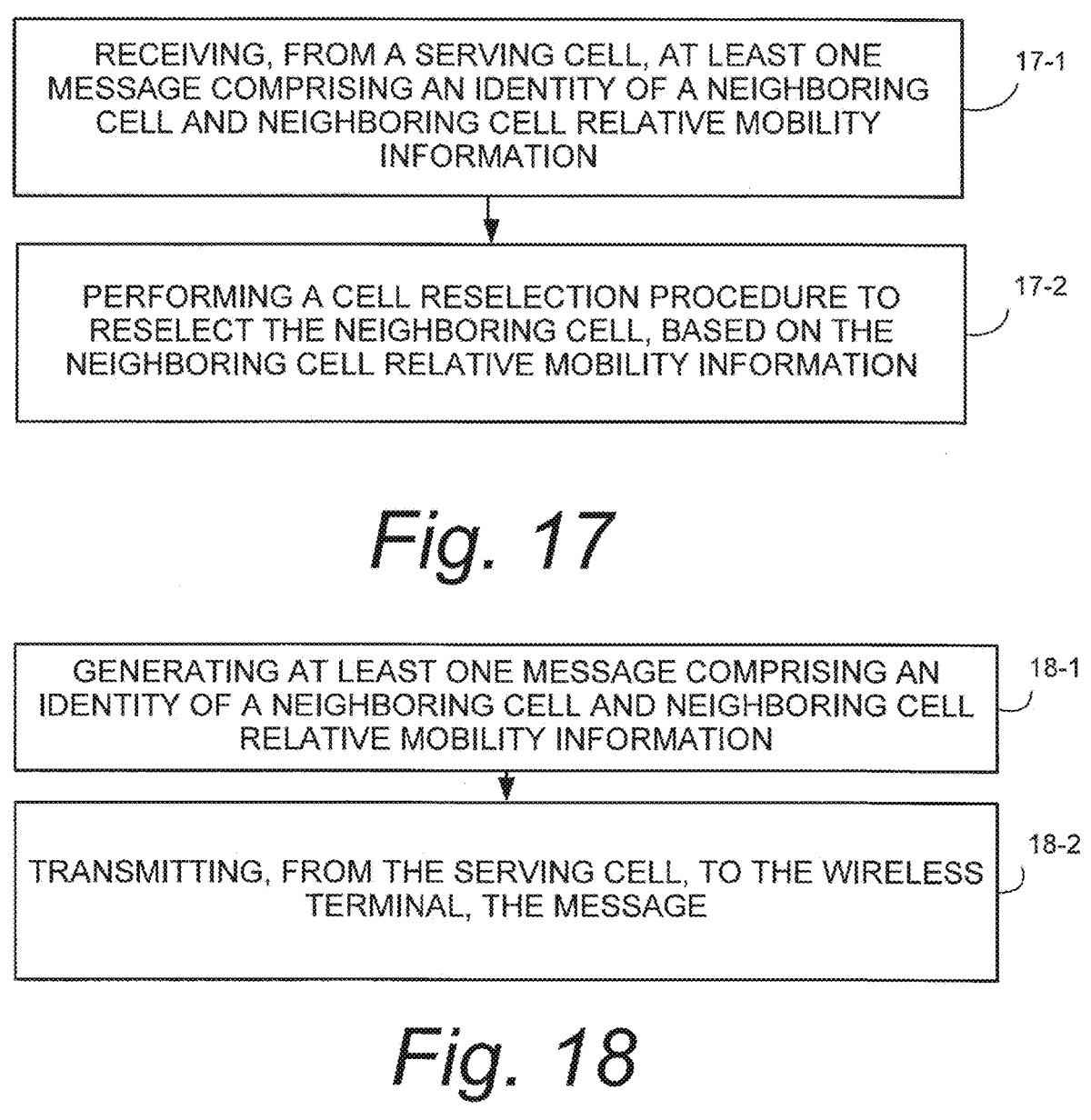

RECEIVING, FROM A SERVING CELL, AT LEAST ONE MESSAGE COMPRISING AN IDENTITY OF A NEIGHBORING CELL AND NEIGHBORING CELL RELATIVE MOBILITY INFORMATION — 17-1

PERFORMING A CELL RESELECTION PROCEDURE TO RESELECT THE NEIGHBORING CELL, BASED ON THE NEIGHBORING CELL RELATIVE MOBILITY INFORMATION — 17-2

*Fig. 17*

GENERATING AT LEAST ONE MESSAGE COMPRISING AN IDENTITY OF A NEIGHBORING CELL AND NEIGHBORING CELL RELATIVE MOBILITY INFORMATION — 18-1

TRANSMITTING, FROM THE SERVING CELL, TO THE WIRELESS TERMINAL, THE MESSAGE — 18-2

*Fig. 18*

NEIGHBORING CELL RELATIVE MOBILITY INFORMATION FOR VEHICLE MOUNTED RELAYS

TECHNICAL FIELD

The technology relates to wireless communications, and particularly to mobile base stations and operations thereof.

BACKGROUND ART

A radio access network typically resides between wireless devices, such as user equipment (UEs), mobile phones, mobile stations, or any other device having wireless termination, and a core network. Example of radio access network types includes the GRAN, GSM radio access network; the GERAN, which includes EDGE packet radio services; UTRAN, the UMTS radio access network; E-UTRAN, which includes Long-Term Evolution; and g-UTRAN, the New Radio (NR).

A radio access network may comprise one or more access nodes, such as base station nodes, which facilitate wireless communication or otherwise provides an interface between a wireless terminal and a telecommunications system. A non-limiting example of a base station can include, depending on radio access technology type, a Node B ("NB"), an enhanced Node B ("eNB"), a home eNB ("HeNB"), a gNB (for a New Radio ["NR"] technology system), or some other similar terminology.

The 3rd Generation Partnership Project ("3GPP") is a group that, e.g., develops collaboration agreements such as 3GPP standards that aim to define globally applicable technical specifications and technical reports for wireless communication systems. Various 3GPP documents may describe certain aspects of radio access networks. Overall architecture for a fifth generation system, e.g., the 5G System, also called "NR" or "New Radio", as well as "NG" or "Next Generation", is shown in FIG. 20, and is also described in 3GPP TS 38.300. The 5G NR network is comprised of NG RAN, Next Generation Radio Access Network, and 5GC, 5G Core Network. As shown, NGRAN is comprised of gNBs, e.g., 5G Base stations, and ng-eNBs, i.e., LTE base stations. An Xn interface exists between gNB-gNB, between (gNB)-(ng-eNB) and between (ng-cNB)-(ng-cNB). The Xn is the network interface between NG-RAN nodes. Xn-U stands for Xn User Plane interface and Xn-C stands for Xn Control Plane interface. A NG interface exists between 5GC and the base stations, i.e., gNB & ng-eNB. A gNB node provides NR user plane and control plane protocol terminations towards the UE, and is connected via the NG interface to the 5GC. The 5G NR, New Radio, gNB is connected to AMF, Access and Mobility Management Function, and UPF, User Plane Function, in the 5GC, 5G Core Network.

In certain urban environments, installing additional base stations on buildings or other infrastructure sites may face typical deployment challenges and burdens, such as real estate availability and costs, or constraining regulations. In the same urban environments, in conjunction with the high density of users, one can also expect the presence and availability of many vehicles around, e.g., for public/private passengers transportation, goods delivery, food trucks etc., typically moving at low/pedestrian speed (or temporarily stationary). Some of the vehicles can follow a certain known/predictable itinerary (e.g., buses or trams, etc.), or be situated in specific locations (e.g., outside stadiums), through or around areas where extra cellular coverage and capacity would be needed. Those vehicles would indeed offer a convenient and efficient place in which to install on board base stations acting as relays, for providing 5G coverage and connectivity to neighboring UEs outside the vehicle. Vehicle relays are obviously very suitable and optimal for connecting users or devices inside the vehicle itself, not only in urban areas but also other environments and vehicle speeds, e.g. for passengers in buses, car/taxi, or trains. In other scenarios, e.g., during an outdoor sport race or pedestrian events, vehicles equipped with relays could conveniently move along with users or devices that are outside the vehicle and provide service to them.

The technical benefits of using vehicle relays may include, among others, the ability of the vehicle relay to get better macro coverage than the nearby UE, thanks to better RF/antenna capabilities, thus providing the UE with a better link to the macro network. Additionally, a vehicle relay is expected to have less stringent power or battery constraints than UEs.

In 3rd Generation Partnership Project, 3GPP, a study on vehicle-mounted relays, VMRs, has started to analyze gaps between the existing functionalities and required functionalities. During the study, it is assumed that a VMR will provide the 5G radio interface, NR-Uu interface, to UEs. This means that the VMR will be equipped with base station, e.g., gNB, functionalities to serve one or more cells, and the coverage of the one or more cells may move geographically.

What is needed are methods, apparatus, and/or techniques to deal with challenges caused by the mobility of base stations.

SUMMARY OF INVENTION

In one example, a wireless terminal of a cellular telecommunication system, the wireless terminal communicating with an access node via a serving cell, the wireless terminal comprising: receiver circuitry configured to receive, from the serving cell, at least one message comprising: an identity of a neighboring cell, and; neighboring cell relative mobility information indicating mobility state of the neighboring cell relative to the serving cell, and; processor circuitry configured to perform a cell reselection procedure based on the neighboring cell relative mobility information.

In one example, an access node of a cellular telecommunication system, the access node serving a wireless terminal via a serving cell, the access node comprising: processor circuitry configured to generate at least one message comprising: an identity of a neighboring cell, and; neighboring cell relative mobility information indicating mobility state of the neighboring cell relative to the serving cell, and; transmitter circuitry configured to transmit, from the serving cell, to the wireless terminal, the message, wherein; the neighboring cell relative mobility information is used by the wireless terminal to perform a cell reselection procedure.

In one example, a method for a wireless terminal of a cellular telecommunication system, the wireless terminal communicating with an access node via a serving cell, the method comprising: receiving, from the serving cell, at least one message comprising: an identity of a neighboring cell, and; neighboring cell relative mobility information indicating mobility state of the neighboring cell relative to the serving cell, and; performing a cell reselection procedure based on the neighboring cell relative mobility information.

BRIEF DESCRIPTION OF DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 8 shows an example embodiment and mode of example structures and functionalities of communications system the example embodiment and mode of FIG. 7, including a donor gNB which transmits neighboring cell mobility information.

FIG. 13 is a flowchart view showing representative, example steps or acts performed by a wireless terminal of the communications system of the example embodiment and mode of FIG. 11.

FIG. 14 is a flowchart view showing representative, example steps or acts performed by either or both of a gNB base station node and a mobile base station relay of the communications system of the example embodiment and mode of FIG. 11.

FIG. 17 is a flowchart view showing representative, example steps or acts performed by a wireless terminal of the communications system of the example embodiment and mode of FIG. 15.

FIG. 18 is a flowchart view showing representative, example steps or acts performed by a mobile base station relay of the communications system of the example embodiment and mode of FIG. 15.

DESCRIPTION OF EMBODIMENTS

Figure 1:
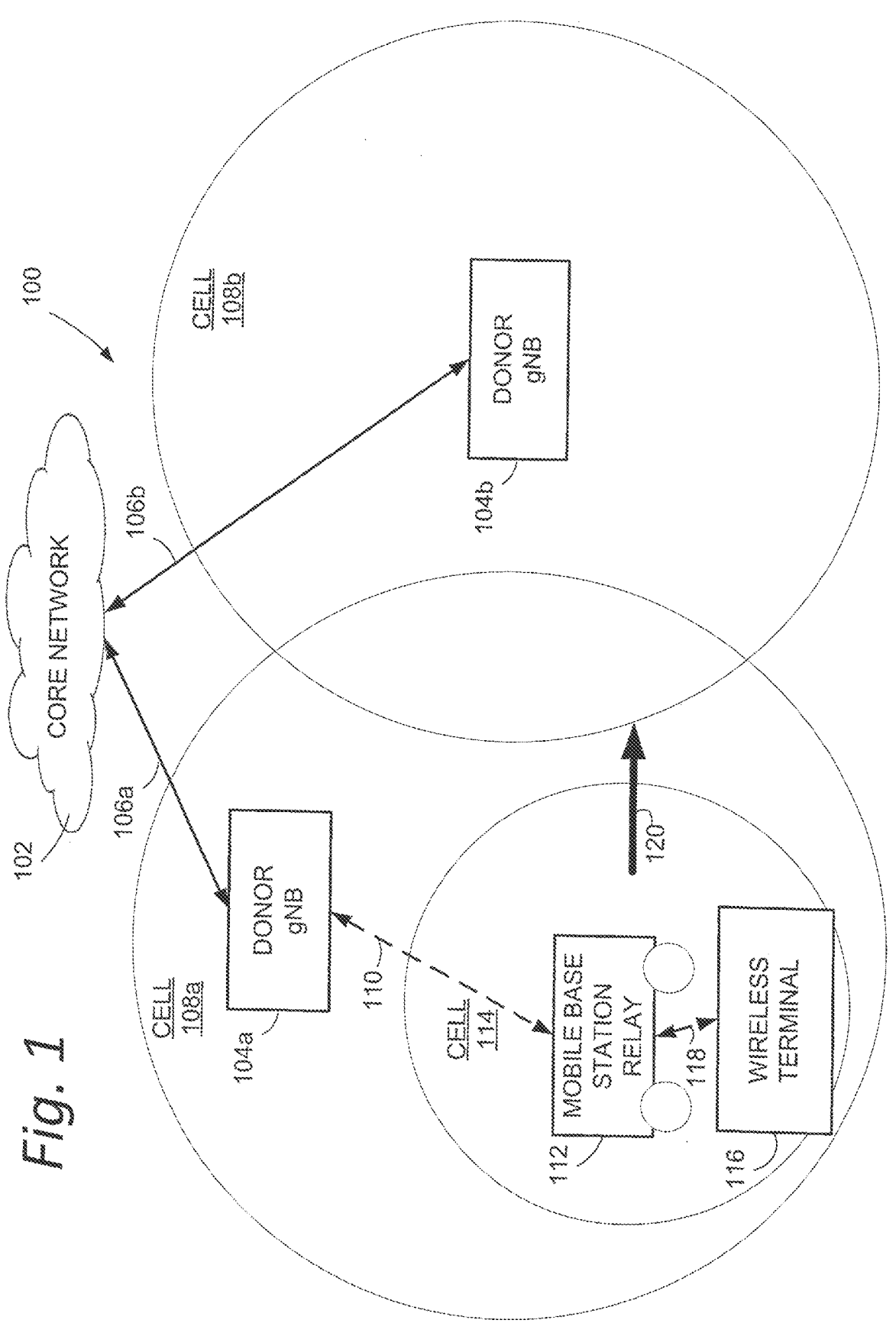
FIG. 1 is a diagrammatic view of a communications system showing both a core network and radio access network, with the radio access network including a mobile base station relay.

In one of its example embodiment and modes the technology disclosed herein concerns a wireless terminal of a cellular telecommunication system. The wireless terminal communicates with an access node via a serving cell and comprises receiver circuitry and processor circuitry. The receiver circuitry is configured to receive, from the serving cell, at least one message comprising an identity of a neighboring cell and neighboring cell relative mobility information indicating mobility state of the neighboring cell relative to the serving cell. The processor circuitry is configured to perform a cell reselection procedure based on the neighboring cell relative mobility information. The cell reselection procedure may result in reselection of the neighboring cell. Methods of operation of such wireless terminals are also provided.

In another of its example embodiment and modes the technology disclosed herein concerns an access node of a cellular telecommunication system. The access node serves a wireless terminal via a serving cell. The access node comprises processor circuitry and transmitter circuitry. The processor circuitry is configured to generate at least one message comprising an identity of a neighboring cell and neighboring cell relative mobility information indicating mobility state of the neighboring cell relative to the serving cell. The transmitter circuitry is configured to transmit, from the serving cell, to the wireless terminal, the message. The neighboring cell relative mobility information is used by the wireless terminal to perform a cell reselection procedure. The cell reselection procedure may result in reselection of the neighboring cell. Methods of operation of such an access node are also provided.

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudo code, and the like represent various processes which may be substantially represented in computer readable medium and so executed by a computer or processor, whether or not such computer or processor is explicitly shown.

1.0 Introduction: Generic Network Architecture and Operation

FIG. 1 shows a system diagram of an example 5G network 100 which comprises a vehicle-mounted relay. The 5G network 100 also comprises a core network 102 connected to one or more radio access network (RAN) nodes, such as Donor gNB 104*a* and donor gNB 104*b*, which are connected to the core network 102 by wirelines 106*a* and 106*b*, respectively. The donor gNB 104*a* serves at least one cell 108*a*. Likewise, the donor gNB 104*b* serves at least one cell 108*b*.

FIG. 1 also shows a mobile base station relay 112, which may be mounted on a vehicle. The mobile base station relay is illustrated by way of example as being under or within the coverage of the cell 108*a* and connected to the donor node 104*b* via a wireless backhaul link 110. The mobile base station relay 112 serves at least one cell 114. A wireless terminal 116 is served via a wireless access link 118. The wireless terminal 116 may be, for example, a user equipment (UE), an integrated access and backhaul (IAB) node or another mobile station relay.

As used herein, the term "telecommunication system" or "communications system" can refer to any network of devices used to transmit information. A non-limiting example of a telecommunication system is a cellular network or other wireless communication system. As used herein, the term "cellular network" or "cellular radio access network" can refer to a network distributed over cells, each cell served by at least one fixed-location transceiver, such as a base station. A "cell" may be any communication channel that is specified by standardization or regulatory bodies to be used for International Mobile Telecommunications-Advanced, "IMTAdvanced". All or a subset of the cell may be adopted by 3GPP as licensed bands, e.g., frequency band, to be used for communication between a base station, such as a Node B, and a UE terminal. A cellular network using licensed frequency bands can include configured cells. Configured cells can include cells of which a UE terminal is aware and in which it is allowed by a base station to transmit or receive information. Examples of cellular radio access networks include E-UTRAN, and any successors thereof, e.g., NUTRAN.

A core network, CN, such as core network (CN) 102 may comprise numerous servers, routers, and other equipment. As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc. For example, core network (CN) 102 may comprise one or more management entities, which may be an Access and Mobility Management Function, AMF.

A radio access network, RAN, typically comprises plural access nodes, one example access nodes 104*a*, 104*b*, and 112 being illustrated in FIG. 1. As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("cNB"), a home cNB ("HeNB"), a gNB (for a New Radio ["NR"] technology system), or some other similar terminology.

As used herein, for a UE in IDLE_Mode, a "serving cell" is a cell on which the wireless terminal in idle mode is camped. See, e.g., 3GPP TS 38.304. For a UE in RRC_CONNECTED not configured with carrier aggregation, CA/dual connectivity, DC, there is only one serving cell comprising of the primary cell. For a UE in RRC_CONNECTED configured with CA/DC the term 'serving cells' is used to denote the set of cells comprising of the Special Cell(s) and all secondary cells. Sec, e.g., 3GPP TS 38.331.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, tablets, net-books, e-readers, wireless modems, etc.

The wireless terminal communicates with its serving radio access network over a radio or air interface. Communication between radio access network (RAN) 22 and wireless terminal over the radio interface occurs by utilization of "resources". Any reference to a "resource" herein means "radio resource" unless otherwise clear from the context that another meaning is intended. In general, as used herein a radio resource ("resource") is a time-frequency unit that can carry information across a radio interface, e.g., either signal information or data information.

An example of a radio resource occurs in the context of a "frame" of information that is typically formatted and prepared, e.g., by a node. In Long Term Evolution (LTE) a frame, which may have both downlink portion(s) and uplink portion(s), is communicated between the base station and the wireless terminal. Each LTE frame may comprise plural subframes. For example, in the time domain, a 10 ms frame consists of ten one millisecond subframes. An LTE subframe is divided into two slots (so that there are thus 20 slots in a frame). The transmitted signal in each slot is described by a resource grid comprised of resource elements (RE). Each column of the two dimensional grid represents a symbol (e.g., an OFDM symbol on downlink (DL) from node to wireless terminal; an SC-FDMA symbol in an uplink (UL) frame from wireless terminal to node). Each row of the grid represents a subcarrier. A resource element (RE) is the smallest time-frequency unit for downlink transmission in the subframe. That is, one symbol on one sub-carrier in the sub-frame comprises a resource element (RE) which is uniquely defined by an index pair (k,l) in a slot (where k and l are the indices in the frequency and time domain, respectively). In other words, one symbol on one sub-carrier is a resource element (RE). Each symbol comprises a number of sub-carriers in the frequency domain, depending on the channel bandwidth and configuration. The smallest time-frequency resource supported by the standard today is a set of plural subcarriers and plural symbols (e.g., plural resource elements (RE)) and is called a resource block (RB). A resource block may comprise, for example, 84 resource elements, i.e., 12 subcarriers and 7 symbols, in case of normal cyclic prefix In 5G New Radio ("NR"), a frame consists of 10 ms duration. A frame consists of 10 subframes with each having 1 ms duration similar to LTE. Each subframe consists of $24^\mu$ slots. Each slot can have either 14 (normal CP) or 12 (extended CP) OFDM symbols. A Slot is typical unit for transmission used by scheduling mechanism. NR allows transmission to start at any OFDM symbol and to last only as many symbols as required for communication. This is known as "mini-slot" transmission. This facilitates very low latency for critical data communication as well as minimizes interference to other RF links. Mini-slot helps to achieve lower latency in 5G NR architecture. Unlike slot, mini-slots are not tied to the frame structure. It helps in puncturing the existing frame without waiting to be scheduled. See, for example, https://www.rfwireless-world.com/5G/5G-NR-Mini-Slot.html, which is incorporated herein by reference.

As understood from the foregoing, the radio access network in turn communicates with one or more core networks (CN) 102 over a RAN-CN interface (e.g., N2 interface).

In a typical deployment scenario, the cell 108a or 108b may be a macro cell, and thus may, if so needed or so planned, cover a relatively large area. On the other hand, the coverage of the cell 114 served by the mobile base station relay 112 may be smaller in extent, e.g., limited to inside the vehicle and/or a nearby area, for example.

In some configurations, the 5G system 100 may perform mobility management functions for the wireless backhaul link 110 of the mobile base station relay 112. Such mobility management functions may include, for example, handovers and connection establishment/re-establishment operations, e.g., connection establishment/re-establishment. In a mobility situation such as that shown in FIG. 1, as the mobile base station relay 112 moves from the coverage of the cell 108a towards the coverage of the cell 108b as depicted by arrow 120, the mobile base station relay 112 may report measurement reports comprising information with regard to absolute/relative signal strength/quality of the signals from the donor gNB 104a and the donor gNB 104b. Based on the measurement reports, the donor gNB 104a may initiate a handover procedure to handover the mobile base station relay 112 to the donor gNB 104b as a target gNB. Mean-while, in a case that the wireless terminal 116 keeps a proximity to the mobile base station relay 112, the wireless terminal 116 may not be aware of the handover on the wireless backhaul link 110. An example of the wireless terminal 116 keeping a proximity to mobile base station relay 112 is the wireless terminal 116 being inside the vehicle.

Figure 2:
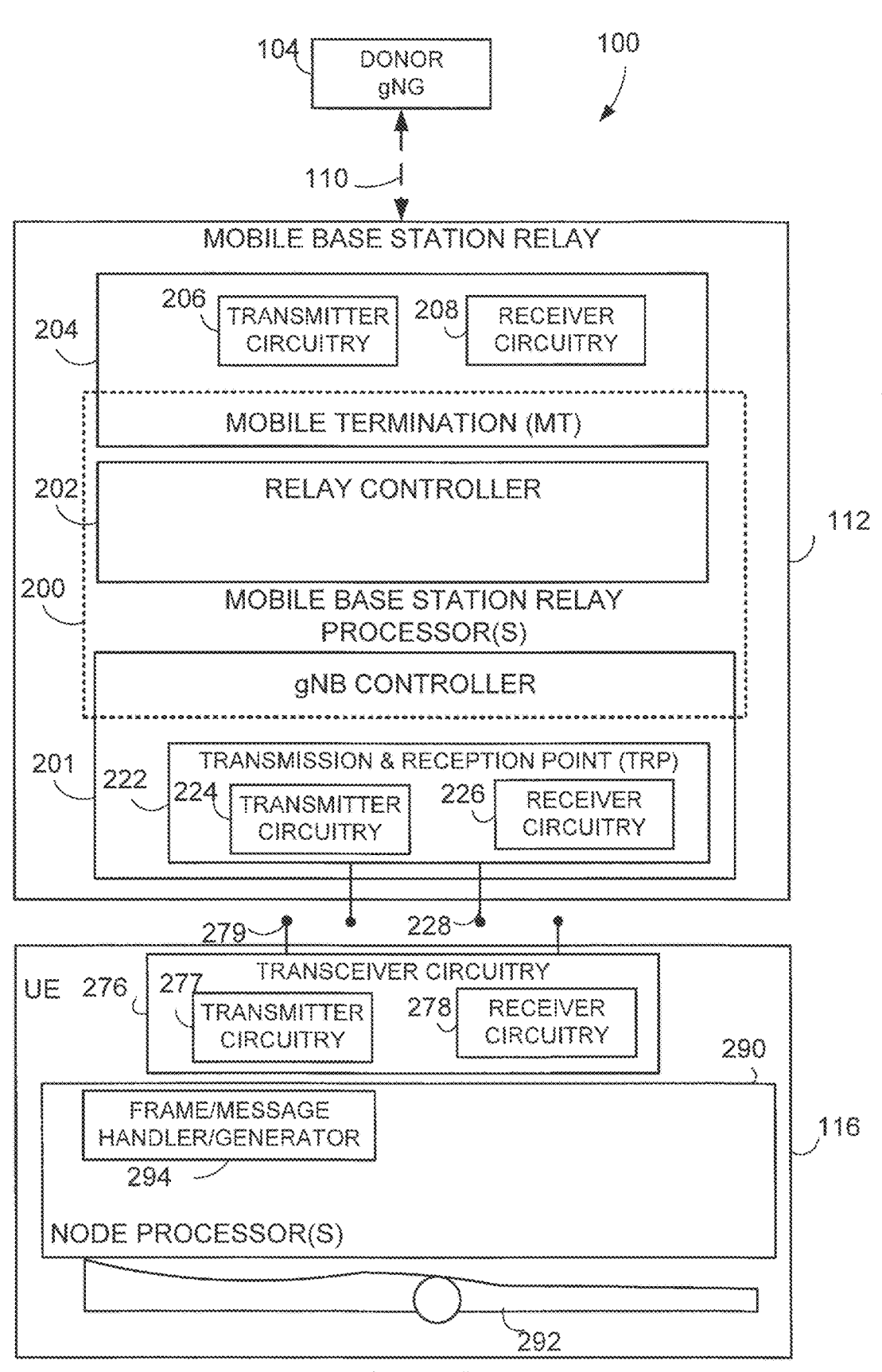
FIG. 2 is a schematic view of nodes of the communications system of FIG. 1, including an example donor node, an example mobile base station relay node, and a wireless terminal node according to an example embodiment and mode.

FIG. 2 shows an example embodiment and mode of an example, representative and generic mobile base station relay 112 and example, representative wireless terminal 116 or UE, such as those depicted in FIG. 1. As shown in FIG. 2, mobile base station relay 112 may comprise one or more mobile station relay processors or mobile station processor circuitry, shown generically as mobile station relay processor 200.

In addition, mobile base station relay 112 may comprise gNB function 201, relay function 202, and mobile termination (MT) function 204. The gNB function 201 may also be referred to herein as gNB controller 201; the relay function 202 may also be referred to herein as relay controller 202; the mobile termination (MT) function 204 may also be referred to herein as mobile termination (MT) controller 204.

The MT function 204 may further comprise transmitter circuitry and receiver circuitry, e.g., transmitter 206 and receiver 208 for the upstream link. The uplink stream may be the wireless backhaul link 110 to cell 114, for example. The MT function 204 may be responsible for maintaining a connection with a donor gNB 114, e.g., the donor gNB 114a or 114b in FIG. 1, for which reason donor gNB is generically labeled as gNB 114 in FIG. 2. In a case that the aforementioned NR-Uu interface is used for the wireless backhaul link 110, the functionality of the MT function 204 may be similar to that of a UE.

The gNB function 201 may further comprise at least one transmission and reception point (TRP) 222. The transmission and reception point (TRP) 222 may further comprise transmitter circuitry and receiver circuitry, e.g., at least one transmitter 224, at least one receiver 226 and one or more antennas 228 for the downstream link, e.g., the wireless access link 118. The gNB function 201 may behave like a regular gNB and may be responsible for managing the cell 114 to serve the wireless terminal 116. The relay function 202 may perform relaying user data and/or signaling traffic from the downstream link to the upstream link, and vice versa.

FIG. 2 also shows various example constituent components and functionalities of wireless terminal 116. For example, FIG. 2 shows wireless terminal 116 as comprising transceiver circuitry 276. The transceiver circuitry 276 in turn may comprise transmitter circuitry 277 and receiver circuitry 278. The transceiver circuitry 276 may include antenna(c) 279 for the wireless transmission. Transmitter circuitry 277 may include, e.g., amplifier(s), modulation circuitry and other conventional transmission equipment. Receiver circuitry 278 may comprise, e.g., amplifiers, demodulation circuitry, and other conventional receiver equipment.

FIG. 2 further shows wireless terminal 116 also comprising wireless terminal processor circuitry, e.g., one or more wireless terminal processor(s) 290. The wireless terminal 116, e.g., wireless terminal processor(s) 290, may comprise frame/message generator/handler 294. As is understood by those skilled in the art, in some telecommunications system messages, signals, and/or data are communicated over a radio or air interface using one or more "resources", e.g., "radio resource(s)".

The wireless terminal 116 may also comprise interfaces 292, including one or more user interfaces. Such user interfaces may serve for both user input and output operations, and may comprise (for example) a screen such as a touch screen that can both display information to the user and receive information entered by the user. The user interface 292 may also include other types of devices, such as a speaker, a microphone, or a haptic feedback device, for example.

It should be understood that the mobility of the cell 114 means that the at least one TRP 222 serving the cell 114 moves geographically at least at some point in time, e.g., the mobile base station relay 112 with its transmission and reception point (TRP) 222 need not always be at a fixed location. The mobility of the TRP 222, when the mobile base station relay 112 moves, causes coverage of the cell 114 to move as well. The mobility may not include a change on the range of the cell while the TRP is at a fixed location.

2.0 Serving Cell Mobility Information: Overview

Figure 3:
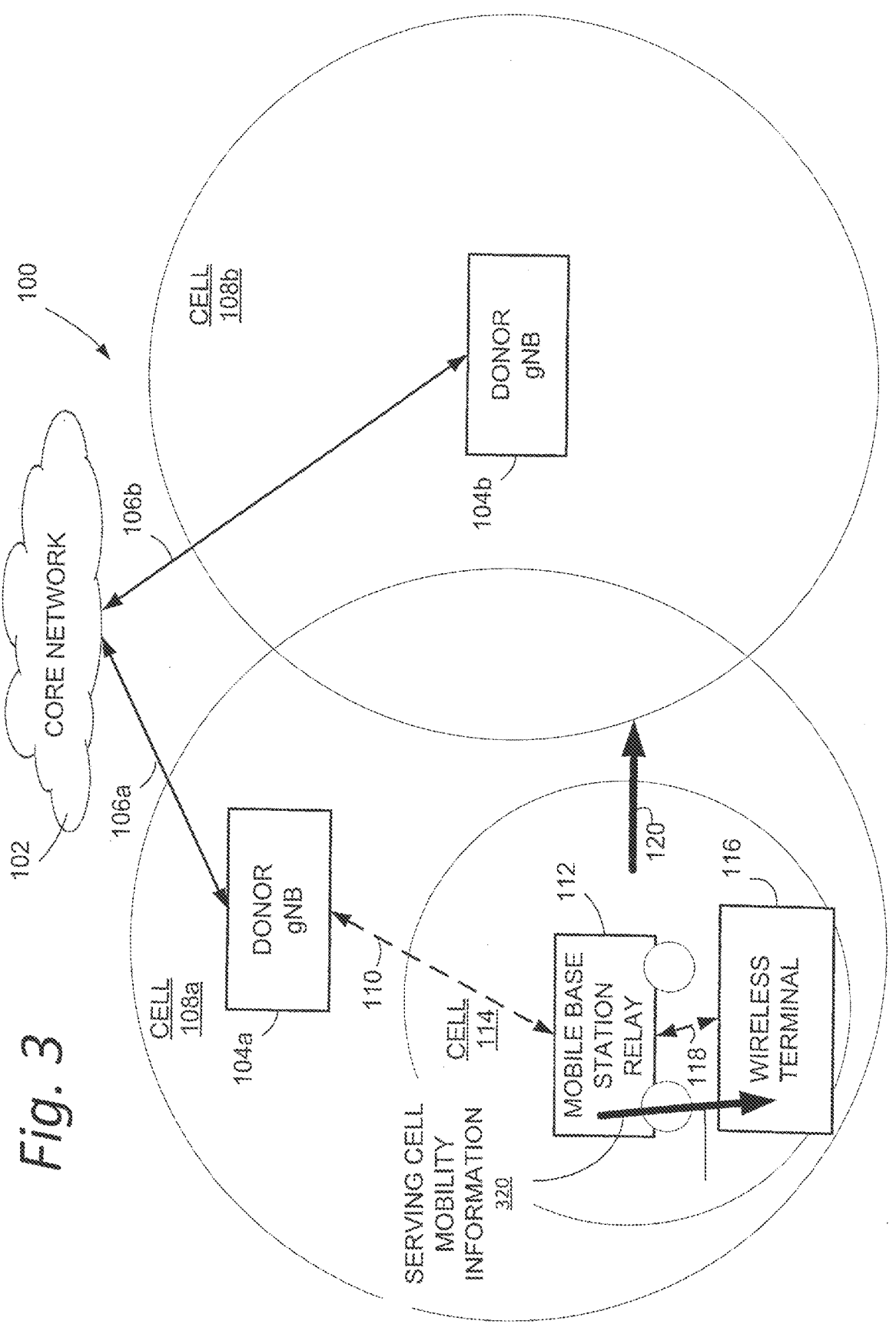
FIG. 3 is a diagrammatic view of a communications system showing both a core network and radio access network, with the radio access network including a mobile base station relay which transmits serving cell mobility information.
Figure 4:
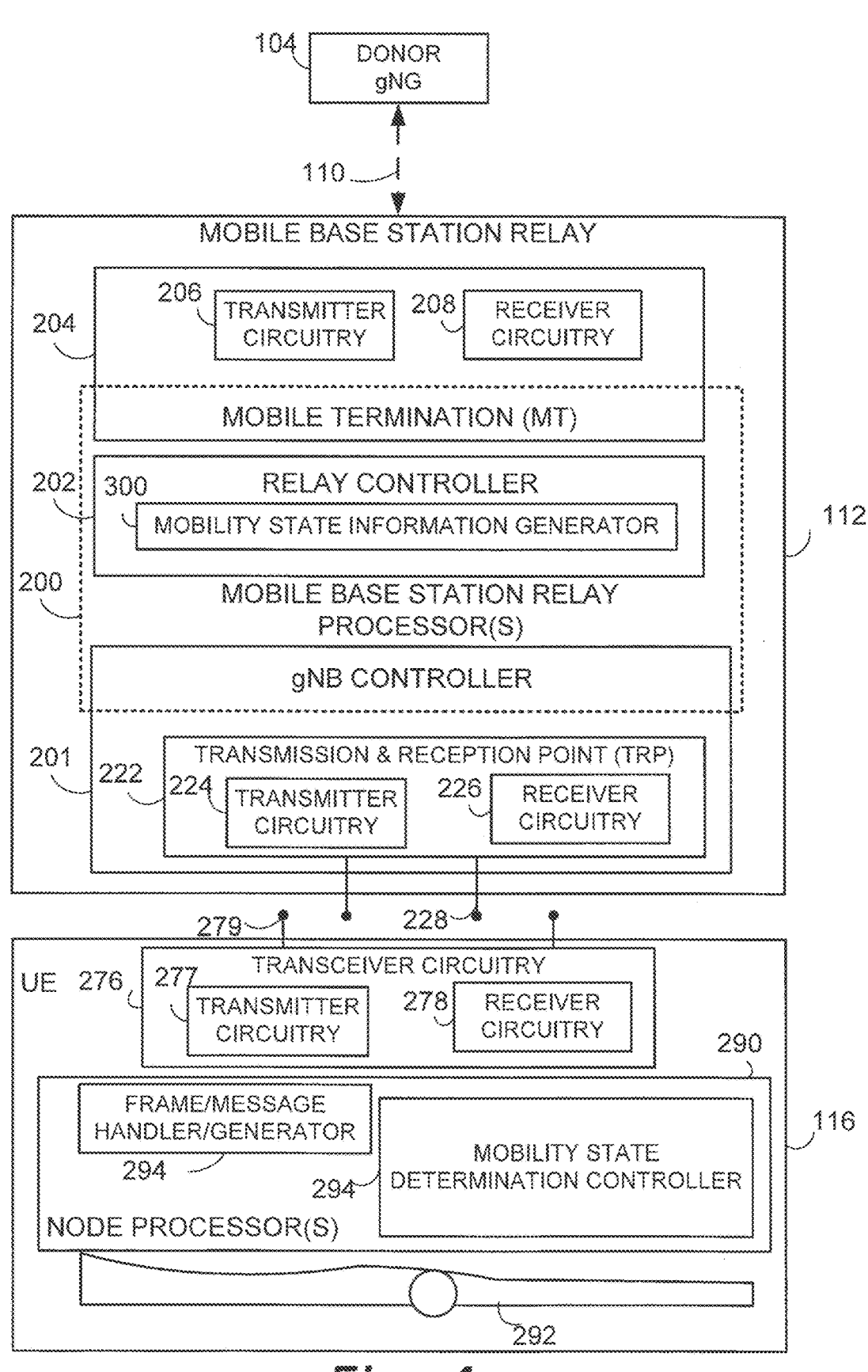
FIG. 4 is a diagrammatic view of example structures and functionalities of an example communications system such as that of FIG. 3 and wherein a mobile base station relay node provides serving cell mobility information to one or more wireless terminals.

FIG. 3 illustrates an exemplary scenario of an example embodiment and mode. FIG. 4 shows structure and functionalities of nodes which may participate in the example scenario of FIG. 3. The structure and functionalities of the example embodiment and mode of FIG. 3 and FIG. 4 are essentially the same as those shown by corresponding reference numerals in FIG. 1 and FIG. 2, unless otherwise noted or evident from the context. In a conventional cellular system, such as Long-Term Evolution (LTE), cells served by base stations are designed to be stationary. Based on this principle, a wireless terminal performs various procedures, including cell selection/reselection, measurements, registrations and handovers. By the introduction of mobile base station relays, such as the mobile base station relay 112 of FIG. 3 and FIG. 4, e.g., in the manner understood with reference to FIG. 1 and FIG. 2, for example, mobility of cells may possibly affect behaviors of wireless terminals, such as the wireless terminal 116 of FIG. 3 and FIG. 4.

In the example embodiment and mode of FIG. 3 and FIG. 4, mobile base station relay 112 includes mobility state information generator 300. With its mobility state information generator 300 the mobile base station relay 112 may inform the wireless terminal 116 of information regarding its mobility, e.g., mobility of the mobile base station relay 112. The information regarding mobility of mobile base station relay 112, which the cell 114 through mobile base station relay 112 provides, is herein referred as "serving cell mobility information", or "serving cell mobility information 320".

Specifically, the cell 114 of FIG. 3 may transmit the serving cell mobility information 320 to the wireless terminal 116. As shown in FIG. 4, the mobile base station relay 112 may comprise mobility state information generator 300 which generates and/or stores the serving cell mobility information which mobile base station relay 112 provides to wireless terminal 116. The mobility state information generator 300 may comprise or be realized by mobile station relay processor 200, e.g., by relay controller 202. The mobility state information generator 300 may obtain the serving cell mobility information which it transmits in one or more of several ways. For example, the mobility state information generator 300 may obtain the serving cell mobility information from pre-configured information, from configured information received from the donor gNB or the core network, or from a device which may be equipped in the vehicle that detects and/or monitors the mobility and optionally other parameters or characteristics of the vehicle and its travel.

Upon receipt by wireless terminal 116, the serving cell mobility information 320 may be used by the wireless terminal 116 to determine mobility state of the cell that the wireless terminal 116 is camping on or attempts to camp on. FIG. 4 thus further shows wireless terminal 116 as comprising mobility state determination controller 330. The mobility state determination controller 330 may process and may act upon the serving cell mobility information received by wireless terminal 116 through transceiver circuitry 276. For example, the serving cell mobility information 320 may be further used by applications and/or processes running on the wireless terminal 116. One example of usage for the cell mobility information is disclosed in a cell reselection determination or procedure, as described with reference to the example embodiment and mode of FIG. 11-FIG. 14, for example.

2.1 Serving Cell Mobility Information: Manner of Transmission

The serving cell mobility information 320 may be broadcasted in the cell 114 via system information. In this case, the serving cell mobility information 320 may be included in Master Information Block (MIB), System Information Block Type 1 (SIB1) and/or other system information blocks (SIBs), per 3GPP TS 38.331. See, e.g., 3GPP TS 38.331 V16.2.0 (2020-09), 3rd Generation Partnership Project; Technical Specification Group Radio Access Network; NR; Radio Resource Control (RRC) protocol specification (Release 16), which is incorporated herein by reference in its entirety and hereinafter also referred to as "3GPP TS 38.331".

Additionally, or alternatively, the serving cell mobility information 320 may be transmitted to the wireless terminal 116 via a dedicated signaling, such as Radio Resource Control (RRC) signaling per 3GPP TS38.331. In the case of the RRC dedicated signaling, an RRC message, such as an RRCReconfiguration message or an RRCRelease message may be used. Other types of signaling may also be utilized.

2.2 Serving Cell Mobility Information: Contents

The serving cell mobility information 320 may include one or more attributes or elements to represent the mobility state of the serving cell. These attributes may be included in information elements of a message in which the serving cell mobility information 320 is transmitted.

In one example implementation, one of such attributes may be a cell mobility indicator as a Boolean value, indicating whether or not the cell is "mobile". For example, a base station mounted on a vehicle to move, such as a bus, a train and a taxi, may set to a value or symbol indicative of the cell being "mobile", e.g., the cell mobility indicator may be set to "mobile". For a stationary base station, or a base station mounted on a vehicle but not to move (stationary), such as a temporary base station equipped in a van for an event, the cell mobility indicator may be set with "stationary" (or "fixed" or "not mobile"), or alternatively, the cell mobility indicator may not be present in the system information. Listing 1 shows an example implementation of an example cell mobility indicator, cellMobility Indicator, comprised in the MIB, e.g., which may be included in the Master Information Block (MIB). The wireless terminal 116 that receives the MIB may determine whether or not the cell is "mobile", e.g., served by a mobile base station relay, based on the cell mobility indicator.

320 of FIG. 3. In one example implementation, the serving cell mobility information may be included in a signal(s)

---

Listing 1

```
MIB ::=                      SEQUENCE {
    systemFrameNumber            BIT STRING (SIZE (6)),
    subCarrierSpacingCommon          ENUMERATED {scs15or60,
scs30or120},
    ssb-SubcarrierOffset         INTEGER (0..15),
    dmrs-TypeA-Position              ENUMERATED {pos2, pos3},
    pdcch-ConfigSIB1             PDCCH-ConfigSIB1,
    cellBarred                   ENUMERATED {barred, notBarred},
    intraFreqReselection             ENUMERATED {allowed, notAllowed},
    cellMobilityIndicator            ENUMERATED {mobile, stationary}
}
-- TAG-MIB-STOP
-- ASN1STOP
```

---

In another example implementation, preferably in a case that the MIB is used, the serving cell mobility information 320 may comprise a range of physical cell identities (PCIs). In the 5G cellular system, there are 1,008 unique PCIs available in the system, and one of the PCIs is encoded in a primary synchronization signal (PSS) and a secondary synchronization signal (SSS) broadcasted in a cell. In this implementation, a selected set of PCIs or a range of PCIs may be reserved for mobile base station relays (herein referred as "reserved PCIs"). Upon selecting a cell, the wireless terminal 116 may decode the PSS and the SSS to obtain the PCI of the cell, and then determine if the PCI is included in the reserved PCIs. If the determination is positive, the wireless terminal 116 may consider that the cell is "mobile", otherwise the cell is "stationary", e.g., a conventional cell. In one exemplary implementation, the reserved PCIs may be pre-determined or pre-configured to the wireless terminal 116. In another exemplary implementation, a list of the reserved PCIs may be broadcasted in system information, such as MIB, SIB1 and/or other SIB(s), and thus received by and known to wireless terminal 116.

In addition, the one or more attributes representing the mobility state of the serving cell may further include, but not be limited to, one or more of the following:
  (1) current moving state, e.g., currently moving, currently not moving, capable of moving, etc.;
  (2) speed, e.g., velocity, or class of speed, e.g., high, mid or low;
  (3) a direction of moving; and
  (4) a current position of the cell, e.g., the location of the TRP.

A stationary cell, such as the cell 108a and the cell 108b, may choose to broadcast or not to broadcast the serving cell mobility information 320 for itself. In a case of such a stationary cell choosing to broadcast the serving cell mobility information for itself, the serving cell mobility information 320 may indicate the mobility state as being "stationary". In a case of such a stationary cell choosing not to broadcast, a wireless terminal, such as the wireless terminal 116 of FIG. 3, may consider the cell as "stationary", even though no cell mobility information is specifically received.

2.3 Serving Cell Mobility Information: Operation

Figures 5, 6:
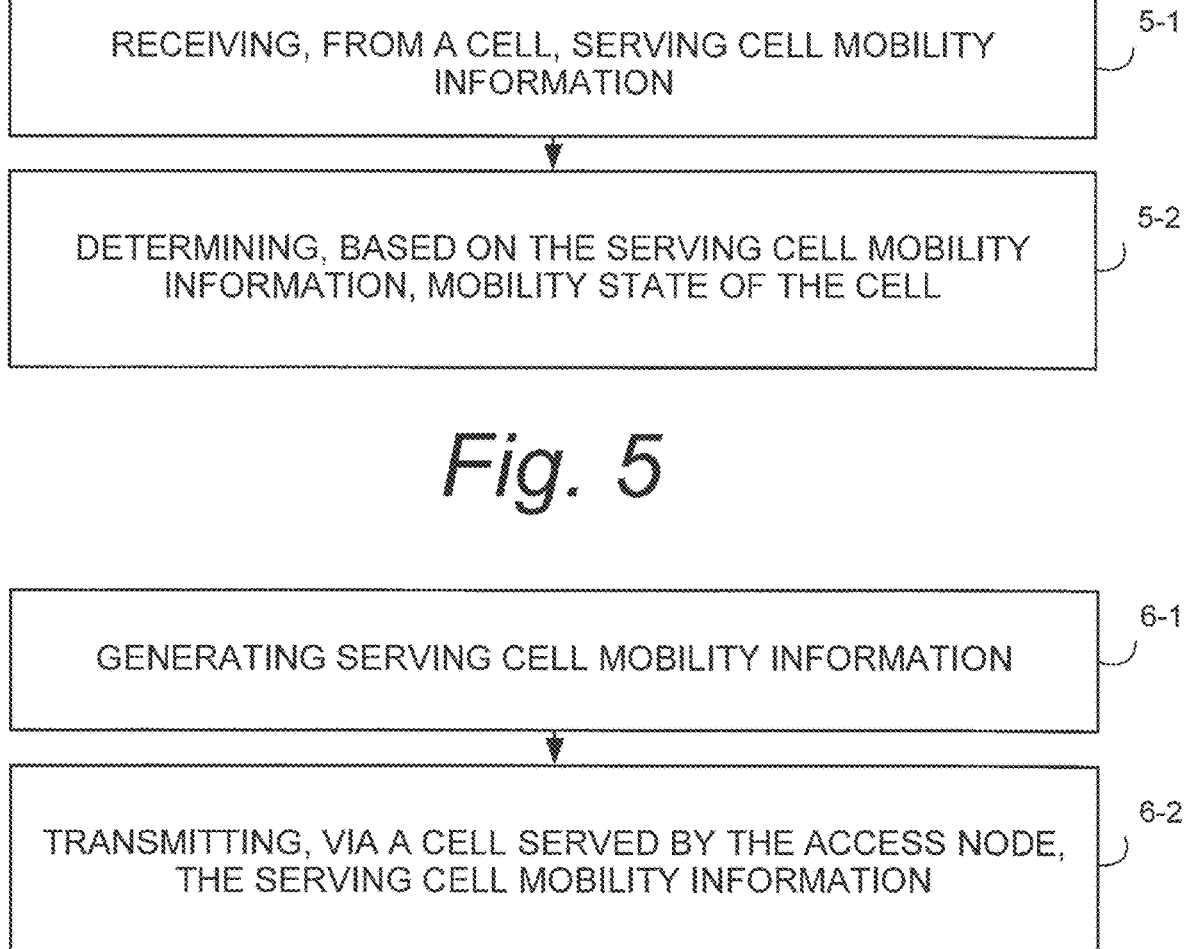
FIG. 5 is a flowchart view showing representative, example steps or acts performed by a wireless terminal of the communications system of the example embodiment and mode of FIG. 3.
FIG. 6 is a flowchart view showing representative, example steps or acts performed by a mobile base station relay node of the communications system of the example embodiment and mode of FIG. 3.

FIG. 5 is a flow chart showing example, representative, generic basic steps or acts performed by a wireless terminal of the example embodiment and mode of FIG. 3. Act 5-1 comprises receiving, from a cell, serving cell mobility information, such as the serving cell mobility information broadcasted by the cell, such as a master information block (MIB), a system information block (SIB), and/or primary/secondary synchronization signals (PSS/SSS). In another example implementation, the serving cell mobility information may be included in a dedicated signaling, such as a radio resource control (RRC) message. Act 5-2 comprises determining, based on the serving cell mobility information, mobility state of the cell. The mobility state determination of act 5-2 may be performed by the mobile station relay processor 200, e.g., by mobility state determination controller 300. The mobility state of the cell may indicate whether or not at least one transmission and reception point (TRP) serving the cell geographically moves. For example, the cell mobility information for serving cell may set to "mobile" in a case a base station serving the cell is a mobile base station relay. Whereas the cell mobility information for serving cell may set to "stationary" in a case a base station serving the cell is a fixed base station, e.g., a fixed TRP. Although not specifically shown in FIG. 5, it is understood that the wireless terminal 116 may perform further operations based on the received serving cell mobility information. Such further operations may include a cell reselection determination/procedure as described with reference to the example embodiment and mode of FIG. 11-FIG. 14, for example.

FIG. 6 is a flow chart showing example representative, generic basic steps or acts performed by an access node of the example embodiment and mode of FIG. 3, e.g., the mobile base station relay 112 of FIG. 3 or a stationary/fixed base station such as the donor gNB 104a/104b of FIG. 3. Act 6-1 comprises generating serving cell mobility information, such as the serving cell mobility information 320 of FIG. 3. Act 6-2 comprises transmitting, via a cell served by the access node, the serving cell mobility information. As mentioned above, in one example implement, the serving cell mobility information may be included in a signal(s) broadcasted by the cell, such as a master information block (MIB), a system information block (SIB), and/or primary/secondary synchronization signals (PSS/SSS). In another example implement, the serving cell mobility information may be included in a dedicated signaling, such as a radio resource control (RRC) message. The serving cell mobility information may be used by a wireless terminal 116 to determine mobility state of the cell. The mobility state of the cell may indicate whether or not at least one transmission and reception point (TRP) serving the cell geographically moves. For example, the serving cell mobility information may set to "mobile" in a case an access node serving the cell is a mobile base station relay. Whereas the serving cell mobility information may set to "stationary" in a case access node serving the cell is a fixed base station (e.g., a fixed TRP).

3.0 Neighboring Cell Mobility Information: Overview

In the previous embodiment, e.g., the example embodiment and mode of FIG. 3-FIG. 6, the serving cell mobility information is aimed to indicate mobility state (e.g., "mobile" or "stationary") of a cell that broadcasts the cell mobility information. In the communications system 100(7) of an example embodiment and mode of FIG. 7-FIG. 10, a serving cell may provide one or more instances of mobility information for a neighboring cell(s). Such instances of mobility information for a neighboring cell may herein be referred as "neighboring cell mobility information". Each of the one or more instances of neighboring cell mobility information may be associated with a corresponding neighboring cell. Similar to the example embodiment and mode of FIG. 3-FIG. 6, when receiving from the serving cell, a wireless terminal of the example embodiment and mode of FIG. 7-FIG. 10 may use the one or more instances of the neighboring cell mobility information for applications and/ or processes, such as cell reselection. The neighboring cell mobility information may preferably be transmitted to and received by the wireless terminal via system information, but it is also possible that other signaling and transmissions may be utilized, such as dedicated signaling, for example, disclosed in the previous example embodiment and mode.

3.1 Neighboring Cell Mobility Information: Example Scenario

Figure 7:
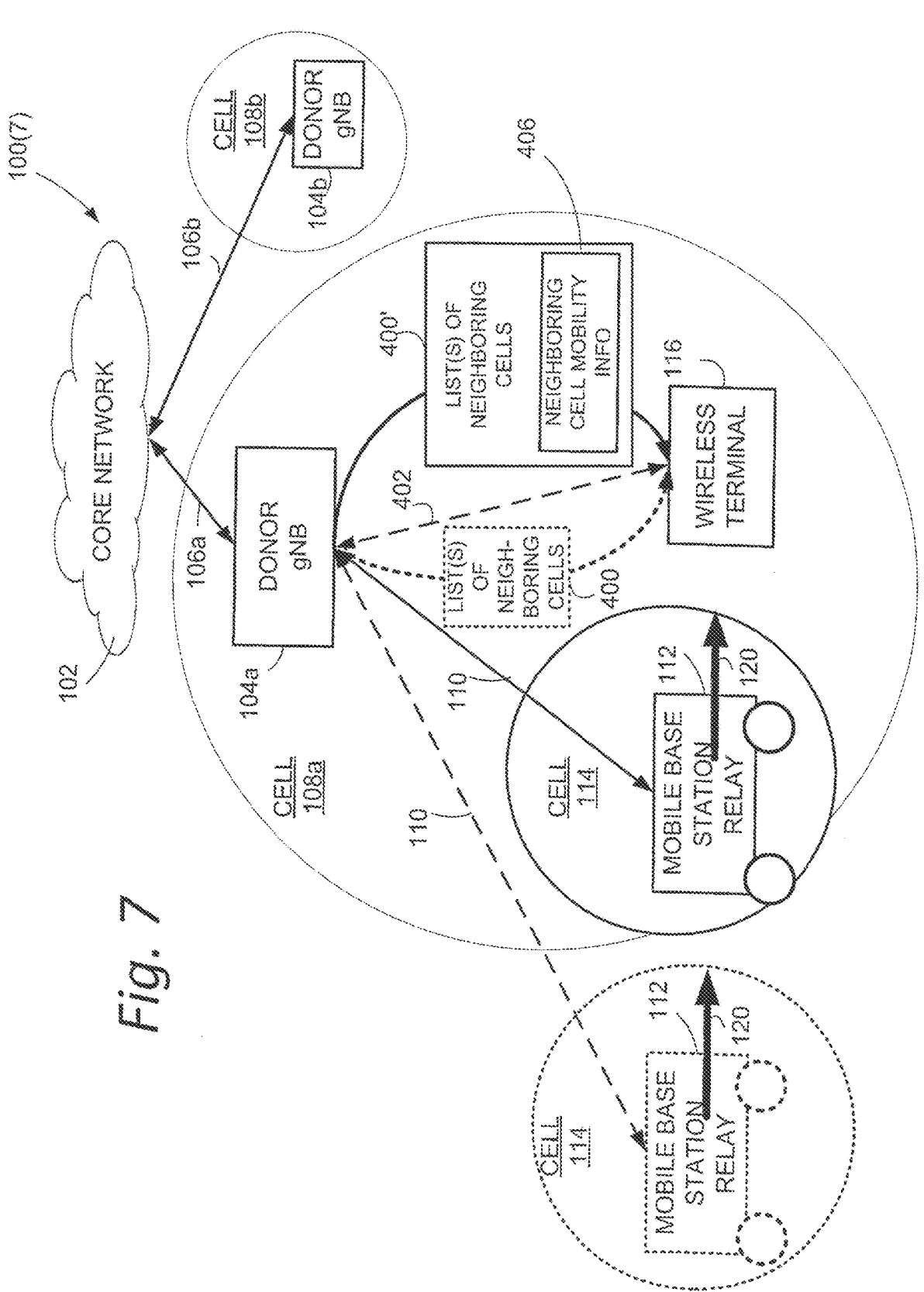
FIG. 7 is a diagrammatic view of a communications system showing both a core network and radio access network, with the radio access network including a Donor gNB node which transmits neighboring cell mobility information to a wireless terminal.

FIG. 7 illustrates an exemplary operation and scenario for an example embodiment and mode wherein neighboring cell mobility information is transmitted. As shown in FIG. 7, a wireless terminal 116 camps on the cell 108a served by the donor gNB 104a via a wireless access link 402. The wireless terminal may obtain, via the cell 108a, a list(s) 400 of neighboring cells. The list(s) 400 of neighboring cells is preferably included in one or more system information blocks (SIBs) broadcasted by the cell 108a, such as SIB3, SIB4 and SIB5. The list(s) 400 of neighboring cells may comprise one or more identities, e.g., physical cell identities, PCIs, of neighboring cells, such as the cell 108b, and may preferably further comprise a radio band/frequency associated with each of some of the neighboring cells operated in inter-frequency bands. At a time in FIG. 7 at which the mobile base station relay 112 is shown in dotted lines the mobile base station relay 112 is not at a nearby location, e.g., not yet in the coverage of the cell 108a, so at such time the list(s) 400 of neighboring cells may not include the identity of the cell 114. As the vehicle mounting the mobile base station relay 112 approaches towards the cell 108a as shown at time in which the mobile base station relay 112 is depicted by solid lines in FIG. 7, the mobile base station relay 112 may establish the wireless backhaul link 110 to the donor gNB 104a. The establishment of the wireless backhaul link 110 may trigger the donor gNB 104a to update the list(s) 400 of neighboring cells resulting in updated list(s) 400' of neighboring cells, and to start broadcasting updated the list(s) 400' of neighboring cells.

The updating of the list(s) of neighboring cells may include adding the identity of the cell 114 to the list(s) 400' of neighboring cells, as well as removing or adding any other cell identities that may be appropriate at the time. In certain circumstances the list(s) 400 of neighboring cells may include just one neighboring cell, e.g., the cell 114 of the mobile base station relay 112 shown in FIG. 7.

In an implementation of the example embodiment and mode of FIG. 7 the list(s) of neighboring cells may be associated with one or more instances of neighboring cell mobility information 406 to indicate mobility state of one or more corresponding neighboring cells. For example, one or more of the cells listed in the list(s) of neighboring cells 400' may be a mobile cell, such as a cell having mobile base station relay 112, and for each such mobile cell the list may include or point to neighboring cell mobility information 406, as illustrated in FIG. 7 and described with example reference to Listing 2 below.

Alternatively or additionally, the Donor gNB 104a may transmit, e.g., broadcast, the neighboring cell mobility information in other form, such as without a list of neighboring cells. For example, the Donor gNB 104a may send the wireless terminal 116 a signal or SSB which, without reference to other cells, provides the neighboring cell mobility information for the cell 114 served by mobile base station relay 112.

3.2 Neighboring Cell Mobility Information: Example Nodes

FIG. 8 shows an example embodiment and mode communications system 100(7) showing, e.g., a donor gNB which transmits neighboring cell mobility information, either in the form of the list(s) 400 of neighboring cells or otherwise. The structure and functionalities of the example embodiment and mode of FIG. 7 and FIG. 8 are essentially the same as those shown by corresponding reference numerals in FIG. 1 and FIG. 2, unless otherwise noted or evident from the context. In the example embodiment and mode of FIG. 7 and FIG. 8, Donor gNB 104a includes neighboring cell mobility state information generator 410. With its neighboring cell mobility state information generator 410 the Donor gNB 104a may inform the wireless terminal 116 of information regarding mobility of one or more neighboring cells. Specifically, the Donor gNB 104a may transmit the neighboring cell mobility information 406 to the wireless terminal 116. As shown in FIG. 8, the neighboring cell mobility state information generator 410 of Donor gNB 104a may comprise or be realized by Donor gNB 104a processor 424, as hereinafter described. The Donor gNB 104a preferably obtains the neighboring cell mobility information which it transmits from the core network.

FIG. 8 shows wireless access node, e.g., Donor gNB 104a, in one example implementation as comprising central unit 420 and distributed unit 422. The central unit 420 and distributed unit 422 may be realized by, e.g., be comprised of or include, one or more processor circuits, e.g., node processor(s) 424. The one or more node processor(s) 424 may be shared by central unit 420 and distributed unit 422, or each of central unit 420 and distributed unit 422 may comprise one or more node processor(s) 424. Moreover, central unit 420 and distributed unit 422 may be co-located at a same node site, or alternatively one or more distributed units 422 may be located at sites remote from central unit 420 and connected thereto by a packet network. The distributed unit 422 may comprise transceiver circuitry 426, which in turn may comprise transmitter circuitry 427 and receiver circuitry 428. The transceiver circuitry 426 may include antenna(c) for the wireless transmission. Transmitter circuitry 427 may include, e.g., amplifier(s), modulation circuitry and other conventional transmission equipment. Receiver circuitry 428 may comprise, e.g., amplifiers, demodulation circuitry, and other conventional receiver equipment. As further shown in FIG. 8, node processor(s) 424 of gNB 104a may comprise the neighboring cell mobility state information generator 410.

FIG. 8 shows the wireless terminal processor(s) 290 as comprising neighboring cell mobility state determination controller 430. The neighboring cell mobility state determination controller 430 may process and may act upon the neighboring cell mobility information 406 received by wireless terminal 116 through transceiver circuitry 276. For example, the neighboring cell mobility information 406 may be further used by applications and/or processes running on the wireless terminal 116. One example of usage for the neighboring cell mobility information 406 is cell reselection.

3.3 Neighboring Cell Mobility Information: Example Information Content

In one example implementation, the neighboring cell mobility information 406 may comprise the one or more attributes, elements, representing the mobility state, as disclosed in the example embodiment and mode of FIG. 3-FIG. 6. That is, the one or more attributes or elements may comprise the aforementioned cell mobility indicator, and may possibly further comprise other attributes, such as a speed, a direction and a position.

Listing 2 shows an example implementation wherein a SIB3 provides information with regard to intra-frequency neighboring cells, where an optional information element, cellMobilityInfo, may be associated with each of some of the neighboring cells listed in intraFreqNeighCellList. The information element, cellMobilityInfo, may comprise the cell mobility indicator, cellMobilityIndicator, disclosed in the example embodiment and mode of FIG. 3-FIG. 6, and may further comprise a cell mobility speed class, cellMobilitySpeedClass, a direction, cellMobilityDirection and a position of the cell, cellPosition. It is possible to apply this example implementation in a similar manner to SIB4, although not illustrated as such, that provides a list of inter-frequency neighboring cells, and/or SIB5, also shown, that provides a list of inter-RAT, Radio Access Technology, neighboring cells.

---

LISTING 2

```
SIB3 ::=                               SEQUENCE {
    intraFreqNeighCellList                     IntraFreqNeighCellList
OPTIONAL,                       -- Need R
    intraFreqBlackCellList                         IntraFreqBlackCellList
OPTIONAL,                       -- Need R
    lateNonCriticalExtension                   OCTET STRING
OPTIONAL, ...,
    [[
    intraFreqNeighCellList-v1610                                       IntraFreqNeighCellList-v1610
OPTIONAL,                       -- Need R
    intraFreqWhiteCellList-r16                           IntraFreqWhiteCellList-r16
OPTIONAL,                       -- Cond SharedSpectrum2
    intraFreqCAG-CellList-r16                             SEQUENCE (SIZE (1..maxPLMN)) OF
IntraFreqCAG-CellPerPLMN-r16                  OPTIONAL       -- Need R
    ]]
}
IntraFreqNeighCellList ::= SEQUENCE (SIZE (1..maxCellIntra))
OF IntraFreqNeighCellInfo
IntraFreqNeighCellList-v1610::=                              SEQUENCE (SIZE
(1..maxCellIntra)) OF               IntraFreqNeighCellInfo-v1610
IntraFreqNeighCellInfo                  ::= SEQUENCE {
    physCellId                             PhysCellId,
    q-OffsetCell                           Q-OffsetRange,
    q-RxLevMinOffsetCell                       INTEGER (1..8)
OPTIONAL,                       -- Need R
    q-RxLevMinOffsetCellSUL                        INTEGER (1..8)
OPTIONAL,                       -- Need R
    q-QualMinOffsetCell                        INTEGER (1..8)
OPTIONAL,                       -- Need R
    cellMobilityInfo                       CellMobilityInfo
OPTIONAL,                       -- Need R ...
}
CellMobilityInfo ::=                    SEQUENCE              {
    cellMobilityIndicator                  ENUMERATED {mobile, stationary}
    cellMobilitySpeedClass                 ENUMERATED {High, Mid, Low, spare}
OPTIONAL,                       -- Need R
    cellMobilityDirection                  ENUMERATED {N, NE, E, SE, S, SW, W,
NW} OPTIONAL,                   -- Need R
    cellMobilityPosition                      cellPosition,        --
Need R

...
}
```

---

In this example implementation, upon updating the list(s) of neighboring cells, the donor gNB 104a may add an instance of IntraFreqNeighCellInfo to IntraFreqNeighCellList, where the instance may include physCellId set to the PCI of the cell 114 and cellMobilityInfo comprising cellMobilityIndicator set to "mobile" and possibly the other optional attributes, elements. When the mobile base station relay 112 moves away from the cell 108a, the donor gNB 104a may remove the instance of IntraFreqNeighCellInfo from IntraFreq-NeighCellList.

It should be understood that the example embodiment and mode of FIG. 7-FIG. 8 may be used as a complement to the example embodiment and mode of FIG. 3-FIG. 6. For example, the MIB may include the serving cell mobility information only comprising the cell mobility indicator, while one or more SIBs may include the neighboring cell mobility information comprising other attributes, e.g., speed, direction, etc.. The example embodiment and mode of FIG. 7-FIG. 8 may be also used as an alternative of the example embodiment and mode of FIG. 3-FIG. 6, in a case, for example, that reserved PCIs cannot be allocated.

3.4 Neighboring Cell Mobility Information: Example Operation

Figures 9, 10:
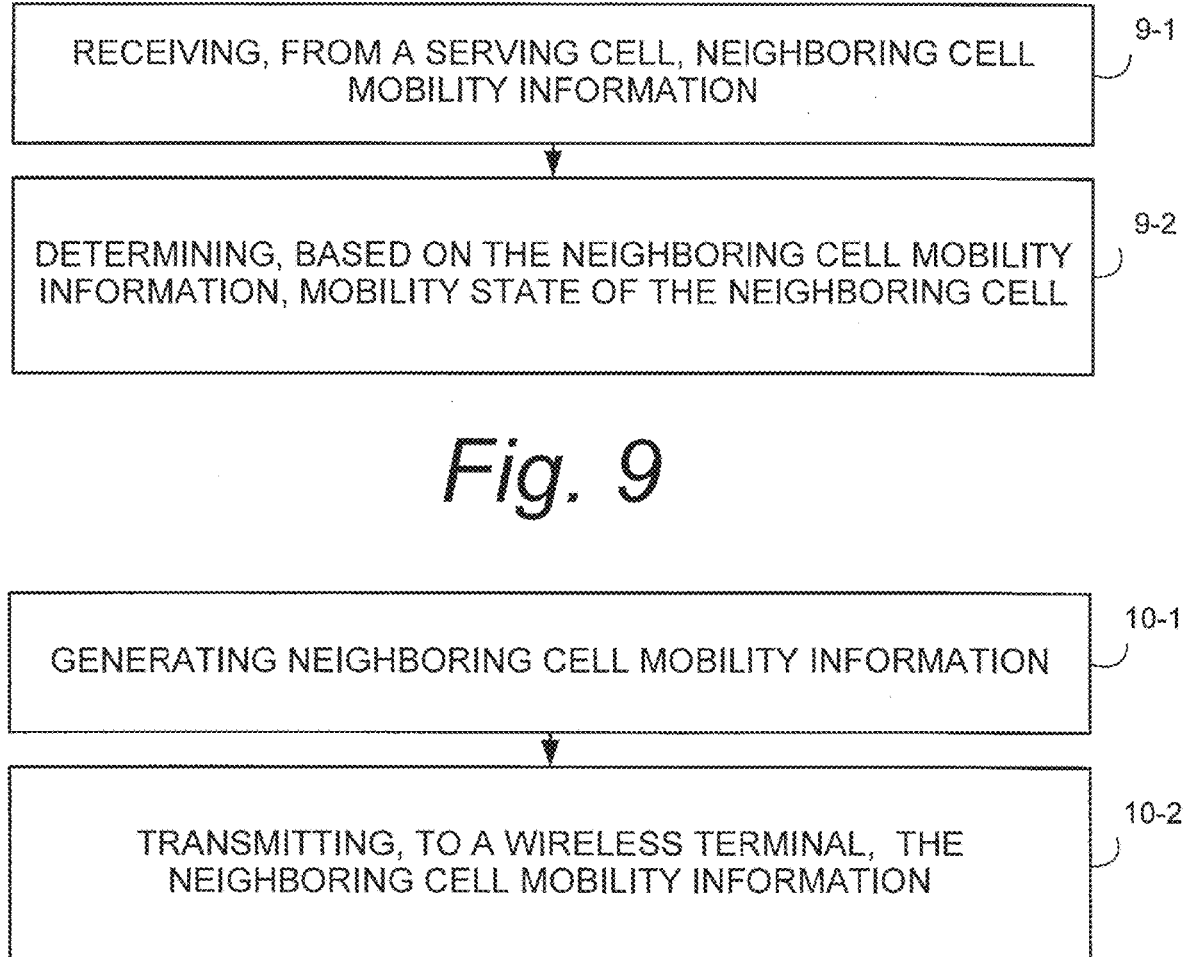
FIG. 9 is a flowchart view showing representative, example steps or acts performed by a wireless terminal of the communications system of the example embodiment and mode of FIG. 7.
FIG. 10 is a flowchart view showing representative, example steps or acts performed by a gNB base station node of the communications system of the example embodiment and mode of FIG. 7.

FIG. 9 is a flow chart showing example representative steps or acts performed by a wireless terminal 116 of the example embodiment and mode of FIG. 7-FIG. 8. Act 9-1 comprises receiving, from a serving cell, neighboring cell mobility information, such as the neighboring cell mobility information 406 of FIG. 7 and FIG. 8, wherein the neighboring cell mobility information may be associated with an identity of a neighboring cell, such as the identity of the cell 114 of FIG. 7. Such an identity of a neighboring cell may be included in the list(s) of neighboring cells 400 of FIG. 7. In one example implementation, the neighboring cell mobility information may be included in one or more system information blocks (SIBs). In another configuration, the neighboring cell mobility information may be included in a dedicated signaling, such as a radio resource control (RRC) message.

Act 9-2 comprises determining, based on the neighboring cell mobility information, mobility state of the neighboring cell. The mobility state may comprise an indication indicating whether or not at least one transmission and reception point (TRP) serving the neighboring cell geographically moves. For example, the cell mobility indicator may set to "mobile" in a case a base station serving the neighboring cell is a mobile base station relay. Whereas the cell mobility indicator may set to "stationary" in a case a base station serving the neighboring cell is a fixed base station (e.g., a fixed TRP). The mobility state may further comprise a speed, a direction and/or a position of the neighboring cell.

FIG. 10 is a flow chart showing example representative steps or acts performed by an access node of the present embodiment, e.g., the mobile base station relay 112 of FIG. 7, or a stationary/fixed base station such as the donor gNB 104a/104b of FIG. 7). Act 10-1 comprises generating neighboring cell mobility information, such as the neighboring cell mobility information 406 of FIG. 7, wherein the neighboring cell mobility information may be associated with an identity of a neighboring cell, such as the identity of the cell 114 of FIG. 7. Such an identity of a neighboring cell may be included in the list(s) of neighboring cells 400 of FIG. 7.

Act 10-2 comprises transmitting, to a wireless terminal, e.g., the wireless terminal 116 of FIG. 7, the neighboring cell mobility information. In one example implementation, the neighboring cell mobility information may be included in one or more system information blocks (SIBs). In another example implementation, the neighboring cell mobility information may be included in a dedicated signaling, such as a radio resource control (RRC) message. The neighboring cell mobility information may be used by a wireless terminal to determine mobility state of the neighboring cell. The mobility state may comprise an indication indicating whether or not at least one transmission and reception point (TRP) serving the neighboring cell geographically moves. For example, the cell mobility indicator may set to "mobile" in a case a base station serving the neighboring cell is a mobile base station relay. Whereas the cell mobility indicator may set to "stationary" in a case a base station serving the neighboring cell is a fixed base station, e.g., a fixed TRP. The mobility state may further comprise a speed, a direction and/or a position of the neighboring cell.

4.0 Cell Reselection Based on Cell Mobility Information: Overview

The example embodiment and mode of FIG. 11-FIG. 14 describes example use of cell mobility information, referring to either or both of the serving cell mobility information disclosed in the example embodiment and mode of FIG. 3-FIG. 6 and the neighboring cell mobility information disclosed in the example embodiment and mode of FIG. 7-FIG. 10, for a wireless terminal to perform a cell reselection procedure. Accordingly, as used herein, particularly with reference to FIG. 11-FIG. 14, the terms "mobility information" and "cell mobility information", which may be used interchangeably, encompass either or both of serving cell mobility information and neighboring cell mobility information.

As previously indicated, a conventional cell reselection procedure may be designed based on the assumption that cells are stationary. When a cell is "stationary", the TRP(s) of that stationary cell does not move. However, in a case that the assumption does not hold, e.g., in a case that the cell(s) do physically/geographically move, the cell reselection procedure may need to take into account the mobility of cells.

4.1 Cell Reselection Based on Cell Mobility Information: Example Scenario

Figure 11:
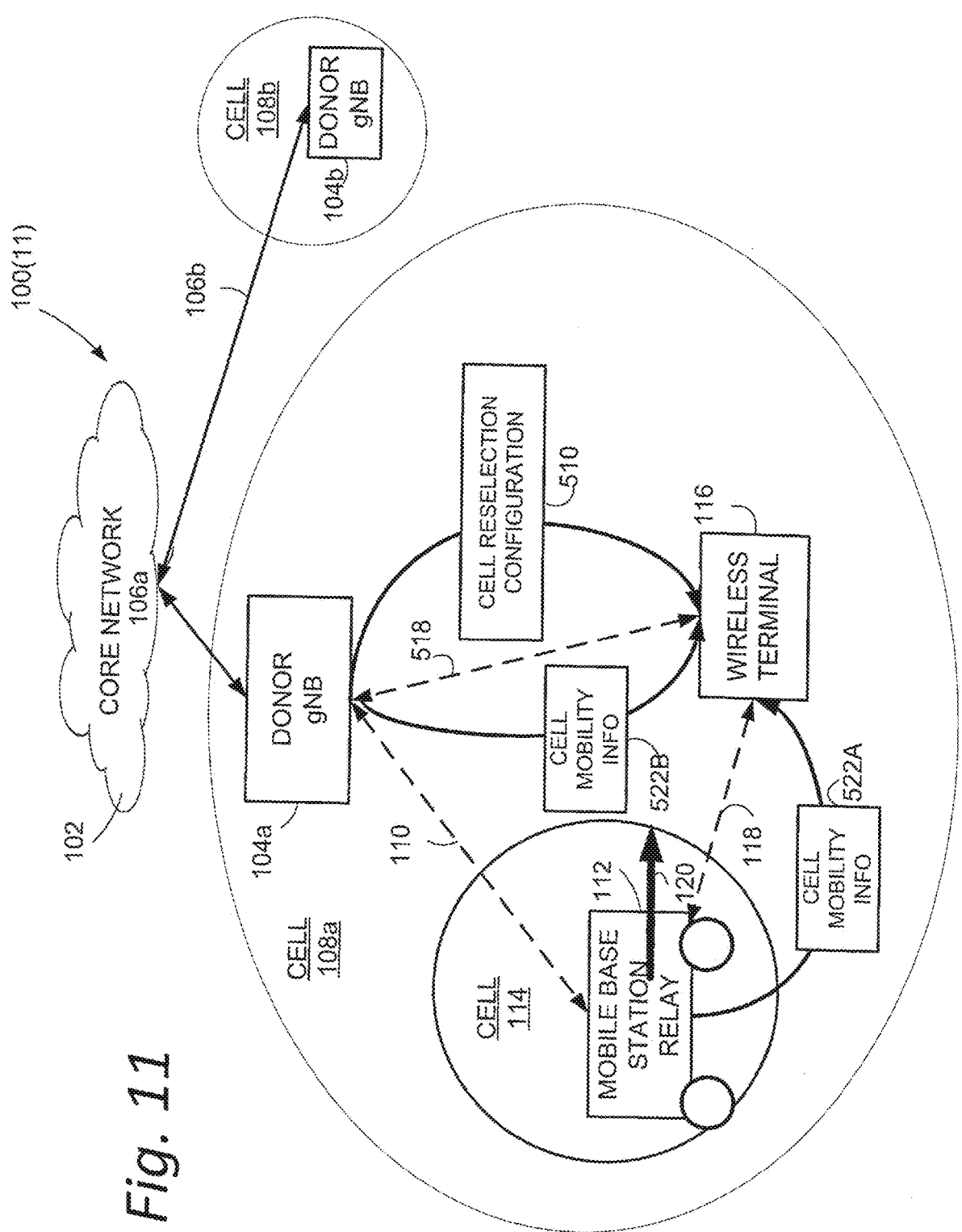
FIG. 11 is a diagrammatic view of a communications system showing both a core network and radio access network, with one or both of a Donor gNB node and a mobile base station relay transmitting cell mobility information and cell reselection configuration to a wireless terminal which may perform a cell reselection determination or procedure.

FIG. 11 shows an example scenario of such a case, wherein the wireless terminal 116 in an idle state, e.g., RRC_IDLE, or in an inactive state, e.g., RRC_INACTIVE, may first camp on the cell 108a. Cell 108a is shown in FIG. 11 as a stationary cell. In FIG. 11, the mobile base station relay 112 is carried by or mounted on a vehicle. As the vehicle equipped with the mobile base station relay 112 approaches toward the wireless terminal 116, the wireless terminal 116 may discover the cell 114 which is served by mobile base station relay 112. It is desired that the likelihood of the wireless terminal 116 reselecting the cell 114 be configurable based on the mobility of the cell 114, e.g., dependent on the extent and nature of mobility of cell 114. For example, in some situations it may be desired that the wireless terminal 116 be more likely to reselect the cell 114 if the wireless terminal 116 rides on the vehicle that carries mobile base station relay 112. In other situations, it may be desired that the wireless terminal 116 be more likely to stay on the cell 108a, a stationary macro cell, while the wireless terminal 116 is not in the vehicle carrying mobile base station relay 112, especially when the vehicle which carries mobile base station relay 112 moves in high speed.

In the example embodiment and mode of FIG. 11, the mobile base station relay 112, specifically the transmitter 224 of FIG. 2, may broadcast the cell mobility information for cell 114. The cell mobility information is transmitted over the wireless access link 118. It may be preferred to use the MIB or the PSS/SSS to carry the cell mobility information of cell 114 for the example embodiment and mode of FIG. 11, since such signals are detected first when a wireless terminal 116 discovers a cell. The wireless terminal 116 that receives the cell mobility information may use the mobility indicator included in the cell mobility information to alter the cell reselection procedure, as disclosed below.

4.2 Cell Reselection Based on Cell Mobility Information: Example Nodes

Figure 12:
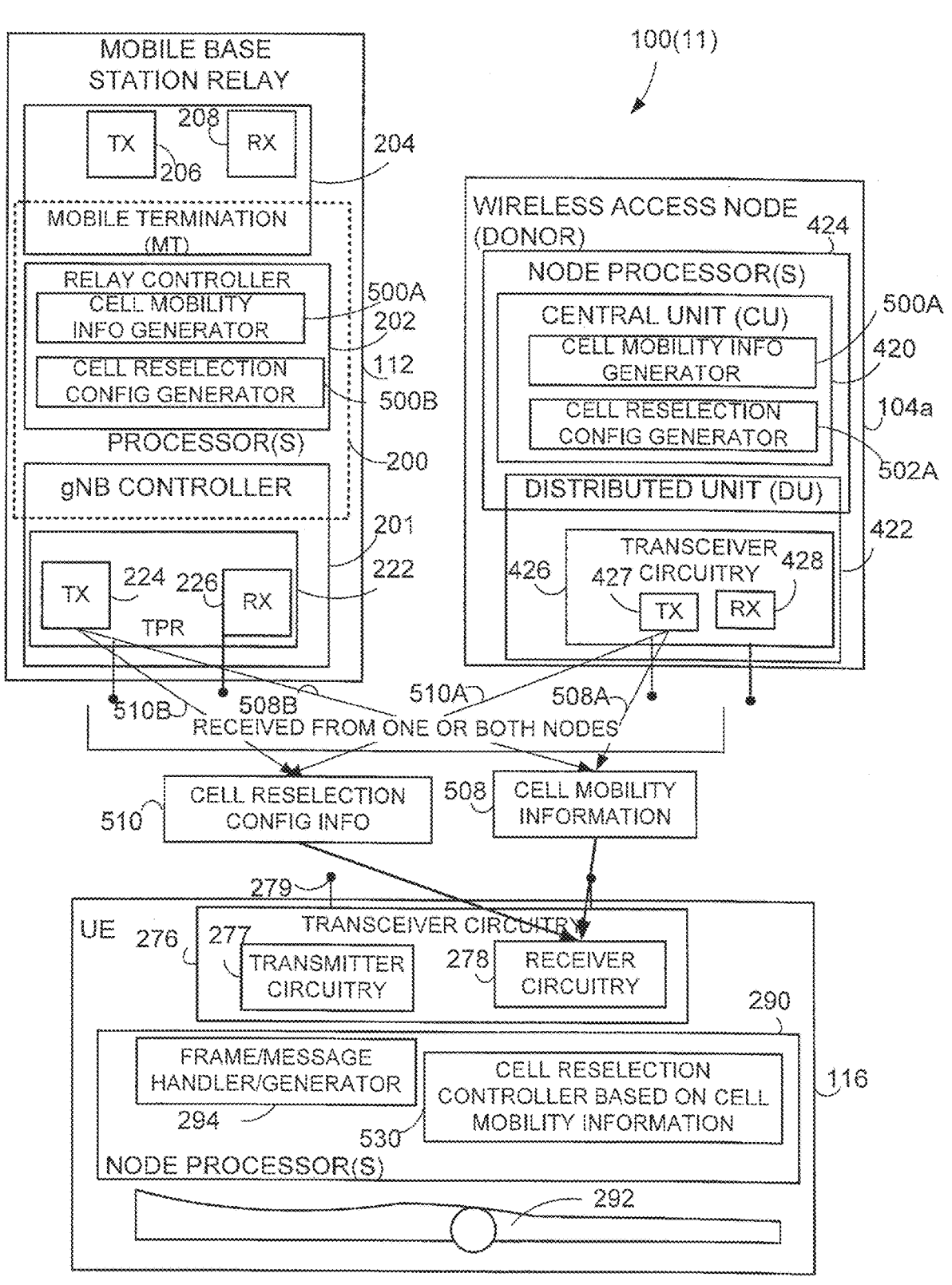
FIG. 12 shows an example embodiment and mode communications system showing example structures and functionalities of a donor gNB, a mobile base station relay, and a wireless terminal according to the example embodiment of FIG. 11.

FIG. 12 shows example structures and functionalities of the example embodiment and mode communications system 100(11) of FIG. 11, showing radio access network including a donor gNB node 104 and a mobile base station relay 112, either of which may transmit cell mobility information and cell reselection configuration information. The structure and functionalities of the example embodiment and mode of FIG. 11 and FIG. 12 are essentially the same as those shown by corresponding reference numerals in the preceding figures, unless otherwise noted or evident from the context. In the example embodiment and mode of FIG. 11 and FIG. 12, Donor gNB 104a includes cell mobility state information generator 500A and cell reselection configuration information generator 502A. One or more, and preferably both, of cell mobility state information generator 500A and cell reselection configuration information generator 502A may comprise or be realized by node processor(s) 424 of Donor gNB 104a. Specifically, the Donor gNB 104a may transmit the cell mobility information 508 generated by cell mobility state information generator 500A to the wireless terminal 116 as cell mobility state information 508A and the cell reselection configuration generated by the cell reselection configuration information generator 502A to the wireless terminal 116 as cell reselection configuration 510A.

FIG. 11 and FIG. 12 further show mobile base station relay 112 as comprising cell mobility state information generator 500B and cell reselection configuration information generator 502B. One or more, and preferably both, of cell mobility state information generator 500B and cell reselection configuration information generator 502B of mobile base station relay 112 may comprise or be realized by mobile station relay processor 200, for example by relay controller 202. The mobile base station relay 112 may transmit the cell mobility information generated by cell mobility state information generator 500B to the wireless terminal 116 as cell mobility state information 508B and the cell reselection configuration generated by the cell reselection configuration information generator 502B to the wireless terminal 116 as cell reselection configuration 510B.

As shown in FIG. 12, either one or both of cell mobility state information 508A and cell mobility state information 508B generated by Donor gNB 104a and mobile base station relay 112, respectively, and/or one or both of cell reselection configuration 510A and cell reselection configuration 510B generated by Donor gNB 104a and mobile base station relay 112, respectively, may be received by wireless terminal 116. As used herein, cell mobility state information 508 generically refers to either of cell mobility state information 508A or cell mobility state information 508B, or both; while cell reselection configuration 510 generically refers to either cell reselection configuration 510A or cell reselection configuration 510B, or both.

The wireless terminal 116 comprises cell reselection controller 530. The cell reselection controller 530 may use the cell mobility state information 508 and the cell reselection configuration 510 to perform a cell reselection procedure, as herein described. The cell reselection controller 530 mat comprise or be realized by wireless terminal processor(s) 290.

4.3 Cell Reselection Based on Cell Mobility Information: Example Operation

The example scenario of FIG. 11 depicts a case where the wireless terminal 116 reselects the mobile cell 114 from, e.g., while in but preparing to leave, the stationary cell 108a. First, the wireless terminal 116 may obtain, from the cell 108a, a currently serving cell, a cell reselection configuration 510 via system information broadcast over the wireless access link 518. The cell reselection configuration 510 may comprise parameters, such as thresholds, offset values, timer values, and/or counter values to be used for evaluations of candidate cells. In addition, the cell reselection configuration 510 of the example embodiment and mode of FIG. 11-FIG. 14 may also comprise a set of parameters designated to be used for evaluation of cells whose mobility state is "mobile". This set of parameters, referred as "reselection parameters for mobile cells", may take effect when the wireless terminal 116 discovers a "mobile" cell, such as the cell 114, but on the other hand may take no effect when the wireless terminal 116 discovers a "non-mobile" cell, e.g., a "stationary" or "fixed" cell, such as the cell 108b. In the scenario of FIG. 11, the wireless terminal 116 camping on the cell 108a may (1) eventually discover the "mobile" cell 114 approaching toward the wireless terminal 116, (2) receive broadcast signal(s) over the wireless access link 118, (3) obtain the cell mobility information indicating that the cell is "mobile", (4) evaluate the cell 114 based on the cell reselection configuration as well as the reselection parameters for mobile cells, and (5) finally make a decision whether or not to reselect the cell 114.

Cell mobility information may be transmitted from the mobile base station relay 112 to the wireless terminal 116 as shown in FIG. 11 by the cell mobility information 522A. The cell mobility information 522A transmitted from mobile base station relay 112 may be the serving cell mobility information disclosed in the example embodiment and mode of FIG. 3-FIG. 6, and as such provides the mobility state of the serving cell which, in this illustration, is the cell 114. Additionally, or alternatively, cell mobility information may also be transmitted from the donor gNB 104a. The cell mobility information transmitted from Donor gNB 104a is shown in FIG. 11 as cell mobility configuration 522B, and may be the neighboring cell mobility information disclosed in the example embodiment and mode of FIG. 7-FIG. 10, and which indicates the mobility state of the neighboring cell, e.g., the cell 104 served by mobile base station relay 112. In a typical cellular network, a cell reselection may be performed based on predetermined/pre-configured criteria. For example, 3GPP TS 38.304 V16.2.0 (2020-09), 3rd Generation Partnership Project; Technical Specification Group Radio Access Network; NR; User Equipment (UE) procedures in Idle mode and RRC, Inactive State (Release 16), herein "3GPP TS 38.304", which is incorporated herein by reference, specifies cell-ranking criteria as shown in Listing 3.

Listing 3

The cell-ranking criterion R& for serving cell and Ru for neighbouring cells is defined by:

$$R_s = Q_{meas,s} + Q_{hyst} - Qoffset_{temp}$$

$$R_n = Q_{meas,n} - Qoffset - Qoffset_{temp}$$

where:

| | |
|---|---|
| $Q_{meas}$ | RSRP measurement quantity used in cell reselections. |
| Qoffset | For intra-frequency: Equals to $Qoffset_{s,n}$, if $Qoffset_{s,n}$ is valid, otherwise this equals to zero. For inter-frequency: Equals to $Qoffset_{s,n}$ plus $Qoffset_{frequency}$, if $Qoffset_{s,n}$ is valid, otherwise this equals to $Qoffset_{frequency}$. |
| $Qoffset_{temp}$ | Offset temporarily applied to a cell as specified in 3GPP TS 38.331 [3]. |

The UE shall perform ranking of all cells that fulfil the cell selection criterion S, which is defined in section 5.2.3.2 of 3GPP TS 38.304.

The cells shall be ranked according to the R criteria specified above by deriving $Q_{meas,n}$ and $Q_{meas,s}$ and calculating the R values using averaged RSRP results.

If rangeToBestCell is not configured, the UE shall perform cell reselection to the highest ranked cell. If this cell is found to be not-suitable, the UE shall behave according to clause 5.2.4.4 of 3GPP TS 38.304.

If rangeToBestCell is configured, then the UE shall perform cell reselection to the cell with the highest number of beams above the threshold (i.e. absThreshSS-BlocksConsolidation) among the cells whose R value is within rangeToBestCell of the R value of the highest ranked cell. If there are multiple such cells, the UE shall perform cell reselection to the highest ranked cell among them. If this cell is found to be not-suitable, the UE shall behave according to clause 5.2.4.4 of 3GPP TS 38.304.

In all cases, the UE shall reselect the new cell, only if the following conditions are met:

the new cell is better than the serving cell according to the cell reselection criteria specified above during a time interval $Treselection_{RAT}$;

more than 1 second has elapsed since the UE camped on the current serving cell.

NOTE: If rangeToBestCell is configured but absThreshSS-BlocksConsolidation is not configured on an NR frequency, the UE considers that there is one beam above the threshold for each cell on that frequency.

$Treselection_{RAT}$

This specifies the cell reselection timer value. For each target NR frequency and for each RAT other than NR, a specific value for the cell reselection timer is defined, which is applicable when evaluating reselection within NR or towards other RAT, e.g., $Treselection_{RAT}$ for NR is $Treselection_{NR}$, for E-UTRAN $Treselection_{EUTRA}$.

NOTE: $Treselection_{RAT}$ is not broadcast in system information but used in reselection rules by the UE for each RAT.

$Treselection_{NR}$

This specifies the cell reselection timer value $Treselection_{RAT}$ for NR. The parameter can be set per NR frequency as specified in 3GPP TS 38.331 [3].

As an exemplary implementation of the example embodiment and mode of FIG. 11-FIG. 14, the reselection parameters for mobile cells may comprise a timer value, $T_{reselectionVMR}$. The timer may be used to differentiate a likelihood of reselecting a mobile cell from a likelihood of reselecting a stationary cell. The timer may also be used to differentiate a likelihood of a wireless terminal in a vehicle reselecting a mobile cell mounted on the vehicle which carries the wireless terminal, from a likelihood of a wireless terminal not in the vehicle reselecting the mobile cell. In the scenario of FIG. 11, if the wireless terminal 116 rides and stays on the vehicle which carries the mobile base station relay 112, it is expected that the signal from the mobile base station relay 112 may be stable for relatively long time, whereas when the wireless terminal 116 is outside of the vehicle that carries the mobile base station relay 112, the wireless terminal 116 will eventually lose the signal as the vehicle moves away. Therefore, in a typical deployment scenario, $T_{reselectionVMR}$ may be set longer than $T_{reselectionNR}$, or $T_{reselectionEUTRA}$, encouraging wireless terminals in the vehicle to reselect a "mobile" cell while discouraging wireless terminals outside of the vehicle.

In another exemplary implementation, the reselection parameters for mobile cells may comprise one or more offset values. For example, in a case that a neighboring cell is "mobile", e.g., the cell 114 while the wireless terminal is camping on the cell 104a, an offset value $Q_{VMRn}$ may be applied to the cell reselection criterion $R_n$ in Listing 1 as follows:

$$R_n = Q_{meas,n} - Qoffset - Qoffset_{temp} - Q_{VMRn}$$

Accordingly, the wireless terminal 116 is likely to reselect a "mobile" cell only when the signal strength/quality from the cell is strong enough.

Additionally, or alternatively, in a case that a serving cell is mobile, e.g., the cell 114 is a serving cell of the wireless terminal 116, one or more offset values for encouraging the wireless terminal 116 to stay camping on the mobile serving cell, e.g., the cell 114, may be configured as a part of the reselection parameters for mobile cells. For example, an offset value QVMRs may be used for the cell reselection criterion $R_s$ in Listing 1 as follows:

$$R_s = Q_{meas,s} + Q_{hyst} - Qoffset_{temp} - Q_{VMRs}$$

In doing so, once it has reselected the cell 114, the wireless terminal 116 is likely to stay on camping the cell 114.

FIG. 13 is a flow chart showing example representative steps or acts performed by a wireless terminal 116 of the example embodiment and mode of FIG. 11-FIG. 14. Act 13-1 comprises camping on a serving cell. Act 13-2 comprises receiving a cell reselection configuration from the serving cell. Act 13-3 comprises receiving cell mobility information, comprising an indication indicating whether or not at least one transmission and reception point (TRP) serving a corresponding cell geographically moves. Act 13-4 comprises performing a cell reselection procedure to determine, based on the cell reselection configuration and the cell mobility information, whether or not to reselect a neighboring cell. Act 13-4 may be performed by cell reselection controller 530. In one example implementation, the corresponding cell is the serving cell. In this example implementation in which the corresponding cell is the serving cell, the cell mobility information may be received from the serving cell. In another example implementation, the corresponding cell is the neighboring cell. In this example implementation in which the corresponding cell is the neighboring cell, the cell mobility information may be received either from the serving cell or the neighboring cell. In addition, the cell reselection configuration may comprise one or more parameters designated for evaluating the corresponding cell during the cell reselection procedure. FIG. 14 is a flow chart showing example representative steps or acts performed by an access node, such as the mobile base station relay 112 of FIG. 11 or a stationary/fixed base station such as the donor gNB 104*a*/104*b* of FIG. 11, which communicates with a wireless terminal such as the wireless terminal 116 of FIG. 11. Act 14-1 comprises generating a cell reselection configuration and cell mobility information. The cell mobility information may be either or both of the serving cell mobility information, as disclosed in the example embodiment and mode of FIG. 3-FIG. 6, and the neighboring cell mobility information as disclosed in the example embodiment and mode of FIG. 7-FIG. 10. The information of act 14-1 may be generated at Donor gNB 104*a* by the cell mobility state information generator 500A and the cell reselection configuration information generator 502A, and/or at mobile base station relay 112 by the cell mobility state information generator 500B and the cell reselection configuration information generator 502B.

Act 14-2 comprises transmitting, in a serving cell, the cell reselection configuration and the cell mobility information. The cell reselection configuration and the cell mobility information may be used by the wireless terminal to perform a cell reselection procedure to determine whether or not the wireless terminal reselects a neighboring cell. In other words, the cell reselection configuration and the cell mobility information are configured to be used by the wireless terminal to perform a cell reselection procedure to determine whether or not the wireless terminal reselects a neighboring cell. Furthermore, the mobility state may comprise an indication indicating whether or not at least one transmission and reception point (TRP) serving a corresponding cell geographically moves. The corresponding cell may be either the serving cell or the neighboring cell. In addition, the cell reselection configuration may comprise one or more parameters designated for evaluating the corresponding cell during the cell reselection procedure.

5.0 Neighboring Cell Relative Mobility Information

The preceding embodiment, e.g., the example embodiment and mode of FIG. 11-FIG. 14, focuses on scenarios and operations wherein the cell mobility information indicates mobility state of a cell of concern. The cell mobility information of the preceding embodiment may be of two types, either serving cell mobility information or neighboring cell mobility information. Of these two types, the serving cell mobility information indicates mobility state of a serving cell, e.g., a cell that broadcasts the serving cell mobility information, whereas the neighboring cell mobility information indicates mobility state of a neighboring cell. In principle, the "mobility state" represents state of mobility relative to the ground, e.g., to some fixed geographic or terrestrial coordinate.

In the example embodiment and mode of FIG. 15-FIG. 18, information indicating a relative movement between two cells is disclosed. The information may be explicitly or implicitly transmitted by a serving cell to one or more wireless terminals that camp on the serving cell, in order to indicate, for example, relative mobility/movement of a neighboring cell. Herein such information that indicates relative movement between two cells is referred as "neighboring cell relative mobility information".

Figure 15:
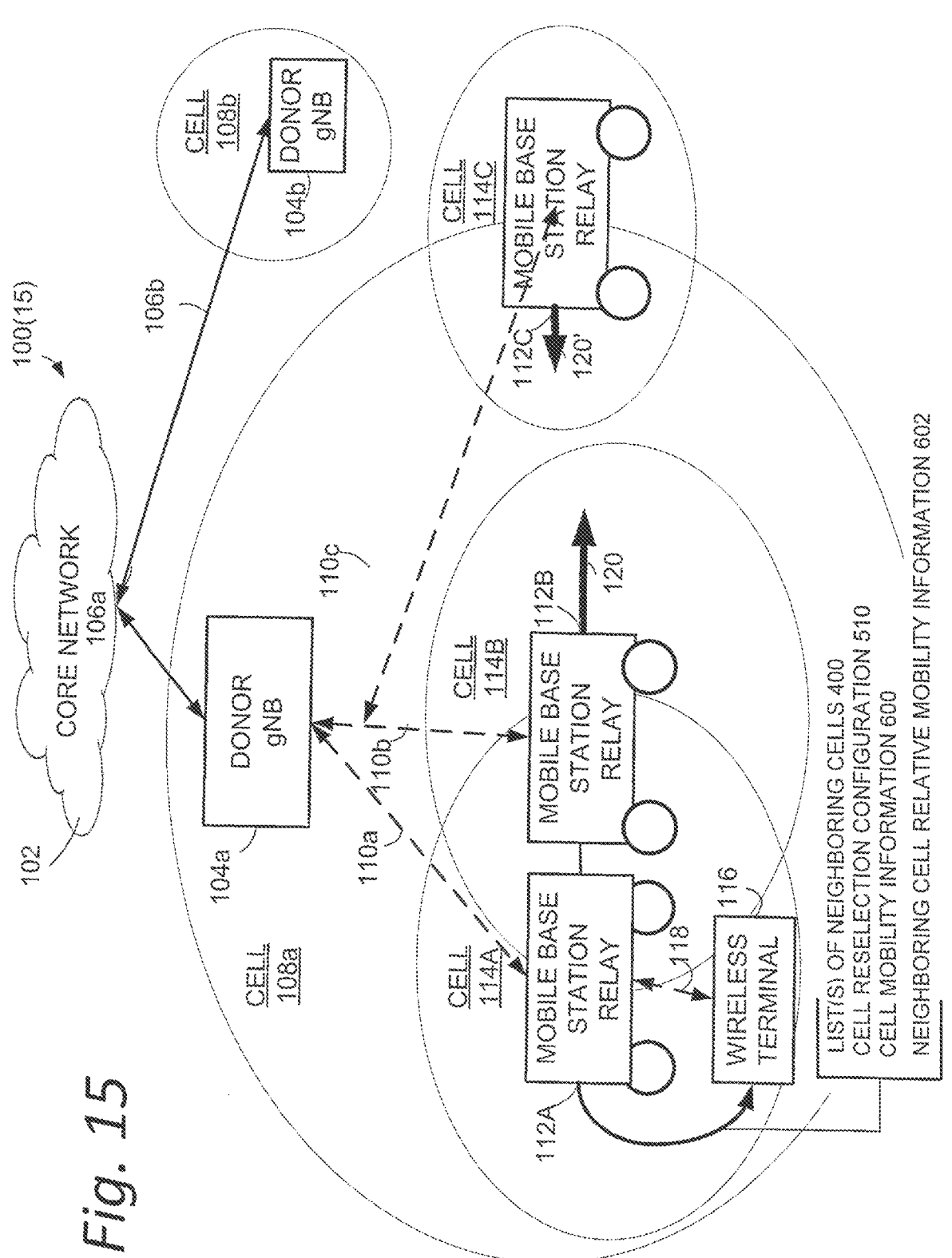
FIG. 15 is a diagrammatic view of a communications system showing both a mobile base station relay transmitting neighboring cell relative mobility information and, optionally, cell reselection configuration to a wireless terminal which may perform a cell reselection determination or procedure.

5.1 Cell Reselection Based on Neighboring Cell Relative Mobility Information: Example Scenario FIG. 15 illustrates an example scenario which may employ the neighboring cell relative movement information. FIG. 15 is similar to the scenarios previously disclosed, such as FIG. 3, FIG. 7 and FIG. 11. However, in FIG. 15 two mobile base station relays 112A and 112B move conjointly, e.g., move together or in unison, and serve cell 114A and cell 114B, respectively. For example, the two base mobile station relays 112A and 112B move at a same velocity in the direction depicted by arrow 120. In an example deployment scenario, the mobile base station relays 112A and 112B may be equipped in different cars of a same train. In the scenario of FIG. 15 the wireless terminal 116 initially camps on the cell 114A, in which the wireless terminal may receive (1) the aforementioned list(s) 400 of neighboring cells; (2) cell reselection configuration 510; and (3) cell mobility information 600. The cell mobility information 600 may comprise serving cell mobility information 320 and/or neighboring cell mobility information 406. Additionally, the wireless terminal 116 of this embodiment and mode may further receive, from the cell 114A via wireless access link 118A, (4) neighboring cell relative mobility information 602, which may indicate the relative mobility/movement of each of neighboring cells, such as cell 114B and cell 114C. The cell 114C is shown as being served by mobile base station relay 112C, which is shown as traveling in a direction 120′ which is different than direction 120. The transmission and reception of the cell reselection configuration, the cell mobility information, and the neighboring cell relative mobility information may occur in several ways, such as, for example, one or more of such configurations/information being included in the list(s) 400 of neighboring cells.

Figure 16:
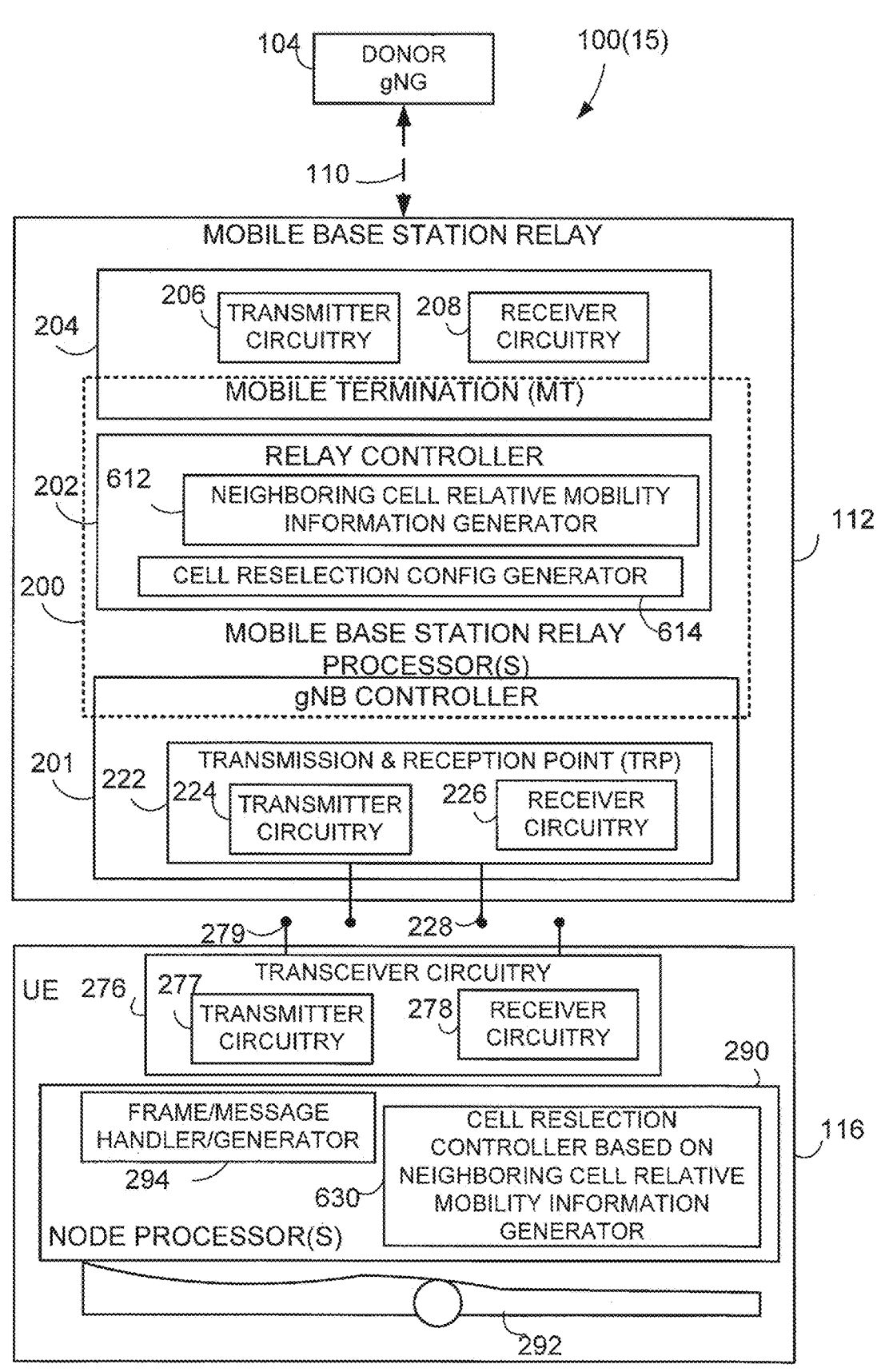
FIG. 16 shows an example embodiment and mode communications system showing example structures and functionalities of a mobile base station relay and a wireless terminal according to the example embodiment of FIG. 15.

5.2 Cell Reselection Based on Neighboring Cell Relative Mobility Information: Example Nodes FIG. 16 shows example structures and functionalities of the example embodiment and mode communications system 100(15) of FIG. 15, showing radio access network including a donor gNB node 104, mobile base station relay 112, and wireless terminal 116. The mobile base station relay 112 shown in FIG. 16 may be representative of any one of the mobile base station relays of FIG. 15, e.g., mobile base station relay 112A, mobile base station relay 112B, and mobile base station relay 112C. The structures and functionalities of the example embodiment and mode of FIG. 15 and FIG. 16 are essentially the same as those shown by corresponding reference numerals in the preceding figures, unless otherwise noted or evident from the context.

As in the preceding embodiment and modes, the mobile base station relay 112 includes gNB controller 201; relay controller 202; and mobile termination (MT) function 204. The gNB controller includes transmission and reception point (TRP) 222, which in turn comprises transmitter 224 and receiver 226.

In the example embodiment and mode of FIG. 15 and FIG. 16, mobile base station relay 112 includes neighboring cell relative mobility information generator 612 and cell reselection configuration generator 614. The cell reselection configuration 510 generated by cell reselection configuration generator 614 may comprise one or more cell reselection parameters. One or both of neighboring cell relative mobility information generator 612 and cell reselection configuration generator 614 may comprise or be realized by node processor(s) 200 of mobile base station relay 112. Specifically, the mobile base station relay 112 may transmit neighboring cell relative mobility information 602, generated by neighboring cell relative mobility information generator 612, to the wireless terminal 116. The mobile base station relay 112 may optionally transmit cell reselection configuration 510 generated by the cell reselection configuration generator 614 to the wireless terminal 116.

In the example embodiment and mode of FIG. 15 and FIG. 16, the node processor(s) 200 of mobile base station relay 112 is configured to generate at least one message comprising an identity of a neighboring cell and neighboring cell relative mobility information indicating mobility state of the neighboring cell relative to the serving cell. The transmitter 224 is configured to transmit the message from the serving cell to the wireless terminal. As explained herein, the neighboring cell relative mobility information is used by the wireless terminal to perform a cell reselection procedure. Such cell reselection procedure may result in a reselection of the neighboring cell.

The mobile base station relay 112 may transmit neighboring cell relative mobility information 602 in a broadcast signal(s) or in system information, such as in a master information block, MIB, or in one or more other system information blocks (SIBs).

As in the preceding embodiment and modes, the wireless terminal 116 comprises transceiver circuitry 276 and node processor(s) 290. The transceiver circuitry 276 comprises terminal transmitter circuitry 277 and terminal receiver circuitry 278.

In the embodiment and mode of FIG. 15-FIG. 18 the wireless terminal 116 comprises cell reselection controller 630. The cell reselection controller 630 may use the neighboring cell relative mobility information 602 to perform a cell reselection procedure, as herein described. The cell reselection controller 630 may comprise or be realized by wireless terminal processor(s) 290.

In the embodiment and mode of FIG. 15-FIG. 16, the receiver circuitry 278 is configured to receive, from the serving cell, at least one message comprising an identity of a neighboring cell and neighboring cell relative mobility information indicating mobility state of the neighboring cell relative to the serving cell. The node processor(s) 290, e.g., cell reselection controller 630, is configured to perform a cell reselection procedure based on the neighboring cell relative mobility information, as herein explained. Such cell reselection procedure may result in a reselection of the neighboring cell.

In an example implementation, the neighboring cell may be mobile relative to the serving cell in a case that at least one transmission and reception point, TRP, 222 for the neighboring cell moves relative to at least one TRP 222 for the serving cell. Conversely, the neighboring cell may be considered to be stationary relative to the serving cell in a case that at least one transmission and reception point, TRP, 222 for the neighboring cell does not move relative to at least one TRP 222 for the serving cell.

5.3 Cell Reselection Based on Neighboring Cell Relative Mobility Information: Example Operation In one example implementation, the neighboring cell relative mobility information 602, transmitted by the mobile base station relay 112A via the cell 114A, may comprise an indication, e.g., a relative mobility indication, for each of some or all of the cells included in the list(s) 400 of neighboring cells. Such relative mobility indication may signify or indicate whether the each of some or all of the neighboring cells is stationary or mobile relative to the cell 114A. For example, the relative mobility indication for the cell 114B, served by the mobile base station relay 112B conjointly moving with the mobile base station relay 112A, may indicate that the cell 114B is stationary relative to the cell 114A. On the other hand, the relative mobility indication for the cell 114C, served by mobile base station relay 112C mounted in a different vehicle, may indicate that the cell 112C is relatively mobile with regard to the cell 114A.

As an exemplary implementation, the relative mobility indicator for each of some or all of the cells included in the list(s) of neighboring cells, e.g., list(s) 400 of neighboring cells, may be included as a part of the aforementioned neighboring cell mobility information 406. Listing 4 shows an example format for a system information block, such as System Information Block SIB3. In the example format of SIB3 shown in Listing 4, for each cell in the list(s) 400 of neighboring cells, the cell mobility information 600 optionally includes neighboring cell relative mobility information 602. For example, in Listing 4 each cell is represented by information element IntraFreqNeighCellInfo, the list(s) 400 of neighboring cells is/are represented by information element IntraFreqNeighCellList, the cell mobility information 600 is represented by information element CellMobilityInfo, and the optional field neighboring cell relative mobility information 602 is represented by information element cellRelativeMobilityIndicator. In the Listing 4 example format, information element cellRelativeMobilityIndicator indicates whether the cell specified by the IntraFreqNeighCellInfo is relatively stationary or mobile with regard to the serving cell that broadcasts SIB3.

| Listing 4 | | | |
|---|---|---|---|
| SIB3 ::= | | SEQUENCE { | |
| introFreqNeighCellList | | | IntraFreqNeighCellList |
| OPTIONAL, | -- Need R | | |
| intraFreqBlackCellList | | | IntraFreqBlackCellList |
| OPTIONAL, | -- Need R | | |
| lateNonCriticalExtension | | | OCTET STRING |
| OPTIONAL, | | | |
| ..., | | | |
| [[ | | | |
| intraFreqNeighCellList-v1610 | | IntraFreqNeighCellList-v1610 | |
| OPTIONAL, | -- Need R | | |
| intraFreqWhiteCellList-r16 | | IntraFreqWhiteCellList-r16 | |
| OPTIONAL, | -- Cond SharedSpectrum2 | | |

-continued

```
                                Listing 4 intraFreqCAG-CellList-r16                          SEQUENCE (SIZE
(1..maxPLMN)) OF IntraFreqCAG-CellPerPLMN-r16
OPTIONAL                    -- Need R
    ]]
}
IntraFreqNeighCellList ::=                         SEQUENCE (SIZE
(1..maxCellIntra)) OF IntraFreqNeighCellInfo
IntraFreqNeighCellList-v1610::=                     SEQUENCE (SIZE
(1..maxCellIntra)) OF IntraFreqNeighCellInfo-v1610
IntraFreqNeighCellInfo ::=               SEQUENCE {
    physCellId                       PhysCellId,
    q-OffsetCell                     Q-OffsetRange,
    q-RxLevMinOffsetCell                   INTEGER (1..8)        OPTIONAL,      --
Need R
    q-RxLevMinOffsetCellSUL                INTEGER (1..8)        OPTIONAL,      --
Need R
    q-QualMinOffsetCell                    INTEGER (1..8)        OPTIONAL,      --
Need R
    cellMobilityInfo                 CellMobilityInfo            OPTIONAL,      --
Need R
    ...
}
CellMobilityInfo ::= SEQUENCE [
    cellMobilityIndicator            ENUMERATED {mobile, stationary}
    cellMobilitySpeedClass           ENUMERATED {High, Mid, Low, spare}
OPTIONAL,                       -- Need R
    cellMobilityDirection            ENUMERATED {N, NE, E, SE, S, SW, W, NW}
OPTIONAL,                       -- Need R
    cellMobilityPosition                   cellPosition,                       --
Need R
    cellRelativeMobilityIndicator ENUMERATED {mobile,
stationary} OPTIONAL, -- Cond cellMobInd
    ...
}
```

In the format shown in Listing 4, the indicator "cellRelativeMobilityIndicator" may be relevant only in a case that both a serving cell and a corresponding neighboring cell are mobile. Thus, the neighboring cell relative mobility information 602 for a corresponding neighboring cell may be optionally present, e.g., may be present only when both the serving cell mobility information indicates that the serving cell is mobile and the neighboring cell mobility information also indicates that the neighboring cell is mobile.

Table 1 shows information about cell mobility broadcasted by the cell 114A of FIG. 15. The serving cell mobility information 320 may indicate that the serving cell 114A is mobile, whereas neighboring cell mobility information 602 may indicate that the two neighboring cells, cell 114B and cell 114C are mobile, and may also indicate that the cell 108a and 108b are stationary, e.g., stationary relative to the ground. In addition, the indicator cellRelativeMobilityIndicator, expressed as "relative mobility" in Table 1 and herein also known as neighboring cell relative mobility information 602, may indicate that cell 114B, conjointly moving with cell 114A, is relatively stationary, while the cell 114C is relatively mobile since cell 114C also moves, but not conjointly with cell 114A, e.g., cell 114C moves differently than cell 114A. In moving "differently" cell 114C moves at either a different rate or different direction than the reference cell, e.g., cell 114A. The indicator for cell 108a or cell 108b, e.g., neighboring cell relative mobility information 602, may not be present, e.g., may be omitted, since they are stationary cells.

TABLE 1

| Cell | Mobility | Relative mobility |
| --- | --- | --- |
| Cell 114A (serving cell) | mobile | N/A |
| Cell 114B (neighboring cell) | mobile | Stationary |
| Cell 114C (neighboring cell) | mobile | Mobile |
| Cell 108a (neighboring cell) | stationary | not present |
| Cell 108b (neighboring cell) | stationary | not present |

In similar manner, Table 2 shows information about cell mobility, e.g., cell mobility information 600, broadcasted by the cell 114C of FIG. 15, wherein the "mobile" neighboring cells, e.g., cell 114A and 114B, are mobile relative to cell 114C.

TABLE 2

| Cell | Mobility | Relative mobility |
| --- | --- | --- |
| Cell 114C (serving cell) | mobile | N/A |
| Cell 114A (neighboring cell) | Mobile | Mobile |
| Cell 114B (neighboring cell) | Mobile | Mobile |
| Cell 108a (neighboring cell) | stationary | not present |
| Cell 108b (neighboring cell) | stationary | not present |

In another configuration, the neighboring cell relative mobility information, such as the neighboring cell relative mobility information 602 of FIG. 15, may further comprise additional parameters with regard to mobility/movement of a neighboring cell relative to a serving cell. For example, such parameters may include a relative speed/velocity and/or a speed class (e.g., high/mid/low) between the serving cell and a neighboring cell.

As an example implementation, the neighboring cell relative mobility information 602 may be utilized by a wireless terminal to improve performance of a cell reselection procedure while the wireless terminal is in an idle state, e.g., RRC_IDLE, or in an inactive state, e.g., RRC_INACTIVE. In the scenario illustrated in FIG. 15, the wireless terminal 116 camps on the cell 114A. The cell 114A may configure the wireless terminal 116 with list(s) 400 of neighboring cells and a cell reselection configuration 510, preferably along with cell mobility information 600, to perform the cell reselection procedure in accordance with one or more of the previously disclosed embodiments. However, in an example implementation of the example embodiment and mode of FIG. 15-FIG. 18, the wireless terminal 116 may be further configured with neighboring cell relative mobility information 602. As a result, the wireless terminal may obtain the information shown in Table 1, which indicates that (1) the serving cell, e.g., cell 114A, is mobile, (2) the neighboring cell 114B is mobile and relatively stationary, (3) the neighboring cell 114C is mobile but not relatively stationary, and (4) the other neighboring cells 108a and 108b are stationary. Based on information such as that of Table 1, the wireless terminal may treat the cell 114B in a special or distinct manner during the cell reselection procedure. That is, the wireless terminal 116 may evaluate the candidate cells for cell reselection using the neighboring cell relative mobility information 602 as a factor. For example, the neighboring cell relative mobility information 602 may indicate that a candidate cell moving relative to the serving cell, and thus also possibly toward the wireless terminal 116, may be a better candidate than another cell that moves conjointly with the serving cell. In another example, the neighboring cell relative mobility information may be used to prioritize a candidate cell that moves conjointly with the serving cell, over another candidate cell moving relative to the serving cell. Example cell re-selection scenarios and/or evaluation criteria for cell re-selection scenarios are described below.

For example, a preceding embodiment discloses use of a timer $T_{reselectionVMR}$ to differentiate a likelihood of reselecting a mobile cell from a likelihood of reselecting a stationary cell. The timer may also be used to differentiate a likelihood of a wireless terminal in a vehicle reselecting a mobile cell mounted on the vehicle, from a likelihood of a wireless terminal not in the vehicle reselecting the mobile cell. In an example implementation of the example embodiment and mode of FIG. 15-FIG. 18, the wireless terminal, configured by a serving cell with multiple timer configurations, may select and invoke a suitable timer upon evaluating a neighboring cell, based on the mobility of the currently serving cell, e.g., serving cell mobility information 320, as well as the mobility of the neighboring cell, e.g., mobility to the ground and/or relative mobility. Five example cases are described below.

Case 1: a serving cell is stationary, and a neighboring cell is also stationary, e.g., stationary relative to the ground. In this case 1, the regular reselection timer, such as $T_{reselectionNR}$ or $T_{reselectionEUTRA}$, may be used to reselect the stationary neighboring cell. This is the situation, for example, in FIG. 7 wherein wireless terminal 116, camping on cell 108a, uses the regular reselection timer, $T_{reselectionNR}$ or $T_{reselectionEUTRA}$, when evaluating cell 108b.

Case 2: a serving cell is stationary, and a neighboring cell is mobile, e.g., mobile in relation to the ground. In this case, the timer $T_{reselectionVMR}$ may be used. For example, wireless terminal 116 of FIG. 11, camping on the stationary cell 108a, may use $T_{reselectionVMR}$ to evaluate cell 114. As disclosed in the previous embodiment, it may be assumed that $T_{reselectionVMR}$ is longer than $T_{reselectionNR}$ or $T_{reselectionEUTRA}$, in order to discourage the wireless terminal to reselect the mobile neighboring cell unless the wireless terminal is certain to move along with the mobile neighboring cell.

Case 3: a serving cell is mobile, and a neighboring cell is stationary, e.g., stationary in relation to the ground. In one example scenario, the timer $T_{reselectionVMR}$ may be used to encourage the wireless terminal inside a vehicle covered by the serving cell to stay on the serving cell. In this scenario, for example, wireless terminal 116 of FIG. 3, camping on the mobile cell 114, may use the timer $T_{reselectionVMR}$ to evaluate the stationary cell 108a or 108b. In another example scenario of the same case, the wireless terminal may be configured to use the regular timer, $T_{reselectionNR}$ or $T_{reselectionEUTRA}$. This is based on a consideration where the mobile serving cell should be stable as far as the wireless terminal stays on the vehicle and thus a shorter timer value is suitable to detect the wireless terminal departs off from the vehicle in a timely manner.

Case 4: a serving cell is mobile, and a neighboring cell is mobile, e.g., mobile in relation to the ground, and relatively moving from the serving cell. In this case, the timer $T_{reselectionVMR}$ may be used with the same reason described in Case 2, e.g., to discourage camping on the neighboring cell. For example, wireless terminal 116 of FIG. 15, camping on the mobile cell 114A, may use $T_{reselectionVMR}$ to evaluate cell 114C.

Case 5: a serving cell is mobile, and a neighboring cell is mobile, e.g, in relation to the ground, but relatively stationary to the serving cell. This case is similar to Case 1 in terms of relationship between the two cells, and thus the regular reselection timer, $T_{reselectionNR}$ or $T_{reselectionEUTRA}$, may be used. For example, wireless terminal 116 of FIG. 15, camping on the mobile cell 114A, may use $T_{reselectionNR}$ or $T_{reselectionEUTRA}$ to evaluate the mobile cell 114B conjointly moving with cell 114A.

Table 3 shows a summary of the above five cases, describing example timer configurations for cell reselections, based on mobility state of a serving cell and a neighboring cell, as well as relative mobility of the neighboring cell.

TABLE 3

| Case | Serving cell mobility state | Neighboring cell mobility state | Neighboring cell relative mobility | Cell reselection timer to be used |
|------|------|------|------|------|
| Case 1 | stationary | stationary | — | $T_{reselectionNR}$ or $T_{reselectionEUTRA}$ |
| Case 2 | stationary | mobile | — | $T_{reselectionVMR}$ |
| Case 3 | mobile | stationary | — | $T_{reselectionVMR}$, or ($T_{reselectionNR}$ or $T_{reselectionEUTRA}$) |
| Case 4 | mobile | mobile | Mobile | $T_{reselectionVMR}$ |
| Case 5 | mobile | mobile | Stationary | $T_{reselectionNR}$ or $T_{reselectionEUTRA}$ |

In one example implementation, the cell selection timer to be used for each case of Table 3 may be pre-determined or pre-configured to the wireless terminal. In another example implementation, the cell selection timer to be used for each case of Table 3 may be network-configured by a base station serving a serving cell via system information broadcast. In this latter example implementation, the serving cell may include information representing cell reselection timer configurations, e.g., Table 3, in one or more master/system information blocks, MIB/SIBs. Using the pre-determined, pre-configured or network-configured cell reselection timer configurations, the wireless terminal may select and apply an adequate timer when evaluating a neighboring cell, based on mobility state of the serving cell and the neighboring cell, as well as relative mobility of the neighboring cell.

In addition, the set of cell reselection timers does not have be limited to the ones described above, e.g., does not have to be limited to $T_{reselectionNR}$, $T_{reselectionEUTRA}$ and $T_{reselectionVMR}$. That is, the pre-determined, pre-configured or network configured cell reselection timer configurations may have flexibilities in assigning any timer value in each case of Table 3. For example, it is possible to assign a different timer configuration for each of the cases.

Thus, in general, the neighboring cell relative mobility information such as neighboring cell relative mobility information 602 may be used to differentiate the behavior/performance of the cell reselection procedure. For example, the wireless terminal may be configured with at least two sets of cell reselection configuration parameters: a first set may be used for evaluating a neighboring cell whose relative mobility is stationary, e.g., moving conjointly; and one or more other set(s) may be used for evaluating a neighboring cell for other cases. Each set may comprise the cell reselection timer configuration(s), e.g., $T_{reselectionVMR}$, or $T_{reselectionNR}$ or $T_{reselectionEUTRA}$), as disclosed above, and may further comprise cell reselection parameters, e.g., thresholds, offsets, etc., such as $Q_{meas,s}$, $Q_{hyst}$, $Q_{offsettemp}$ and/or $Q_{VMRn}$ disclosed previously. The values of such parameters may differ by each set. If a neighboring cell, e.g., cell 114B of FIG. 15, conjointly moves with a serving cell, e.g., cell 114A of FIG. 15, the cell reselection parameters in the first set may be used. Otherwise, a different set of cell reselection parameters may be used. The at least two sets of cell reselection parameters may be pre-determined, pre-configured to the wireless terminal, or network-configured, e.g., by system information broadcast, to the wireless terminal.

FIG. 17 is a flow chart showing example representative steps or acts performed by a wireless terminal, e.g., the wireless terminal 116 of FIG. 15. Act 17-1 comprises receiving, from a serving cell, at least one message comprising an identity of a neighboring cell and neighboring cell relative mobility information. The neighboring cell relative mobility information indicates mobility state of the neighboring cell relative to the serving cell. In one configuration, the mobility state comprises an indication indicating whether the neighboring cell is stationary or mobile relative to the serving cell. In another configuration, the mobility state further comprises a speed or a speed class of the neighboring cell relative to the serving cell. Act 17-2 comprises performing a cell reselection procedure based on the neighboring cell relative mobility information. The cell reselection procedure may result in reselection of the neighboring cell. During the cell reselection procedure, a set of cell reselection parameters to be used to evaluate the neighboring cell may be determined based on the neighboring cell relative mobility information. The set cell reselection parameters may comprise a timer configuration(s), a threshold(s) or an offset value(s). The set of reselection parameters may be pre-determined, pre-configured to the wireless terminal or network configured to the wireless terminal.

FIG. 18 is a flow chart showing example representative steps or acts performed by an access node e.g., the mobile base station relay 112A, 112B or 112C of FIG. 15. Act 18-1 comprises generating at least one message comprising an identity of a neighboring cell and neighboring cell relative mobility information. The neighboring cell relative mobility information indicates mobility state of the neighboring cell relative to the serving cell. In one configuration, the mobility state comprises an indication indicating whether the neighboring cell is stationary or mobile relative to the serving cell. In another configuration, the mobility state further comprises a speed or a speed class of the neighboring cell relative to the serving cell. Act 18-2 comprises transmitting, from the serving cell, to the wireless terminal, the message. The neighboring cell relative mobility information is used by the wireless terminal to perform a cell reselection procedure. The cell reselection procedure may result in reselection of the neighboring cell. During the cell reselection procedure, a set of cell reselection parameters to be used to evaluate the neighboring cell may be determined based on the neighboring cell relative mobility information. The set cell reselection parameters may comprise a timer configuration(s), a threshold(s) or an offset value(s). The set of reselection parameters may be pre-determined, pre-configured to the wireless terminal or network configured to the wireless terminal.

6.0 FURTHER CONSIDERATIONS

Thus in one of its example aspects the technology disclosed herein involves structure and operation of mobile base station relays and nodes operating in conjunction therewith, including but not limited to the following:

An access node serving a cell transmits serving cell mobility information comprising mobility state of the cell. A wireless terminal uses the serving cell mobility information to detect the mobility of the cell.

An access node serving a cell transmits neighboring cell mobility information comprising mobility state of a neighboring cell. A wireless terminal uses the neighboring cell mobility information to detect the mobility of the neighboring cell.

The serving cell mobility information and/or the neighboring cell mobility information is used for a cell reselection procedure based on mobility state of the serving cell and/or the neighboring cell.

Neighboring cell relative mobility information is configured to a wireless terminal by a serving cell. The neighboring cell relative mobility information indicates mobility state of a neighboring cell, the mobility state being relative to the serving cell. A cell reselection procedure is performed for the neighboring cell based on the neighboring cell relative mobility information.

It should be understood that the various foregoing example embodiments and modes may be utilized in conjunction with one or more example embodiments and modes described herein.

Figure 19:
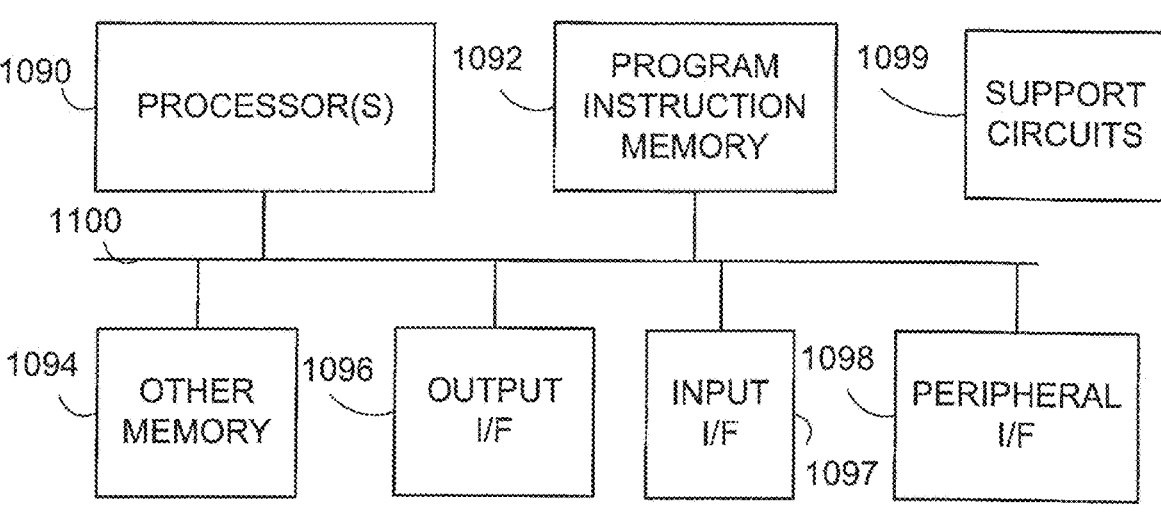
FIG. 19 is a diagrammatic view showing example elements comprising electronic machinery which may comprise a wireless terminal, a radio access node, and a core network node according to an example embodiment and mode.
Figure 20:
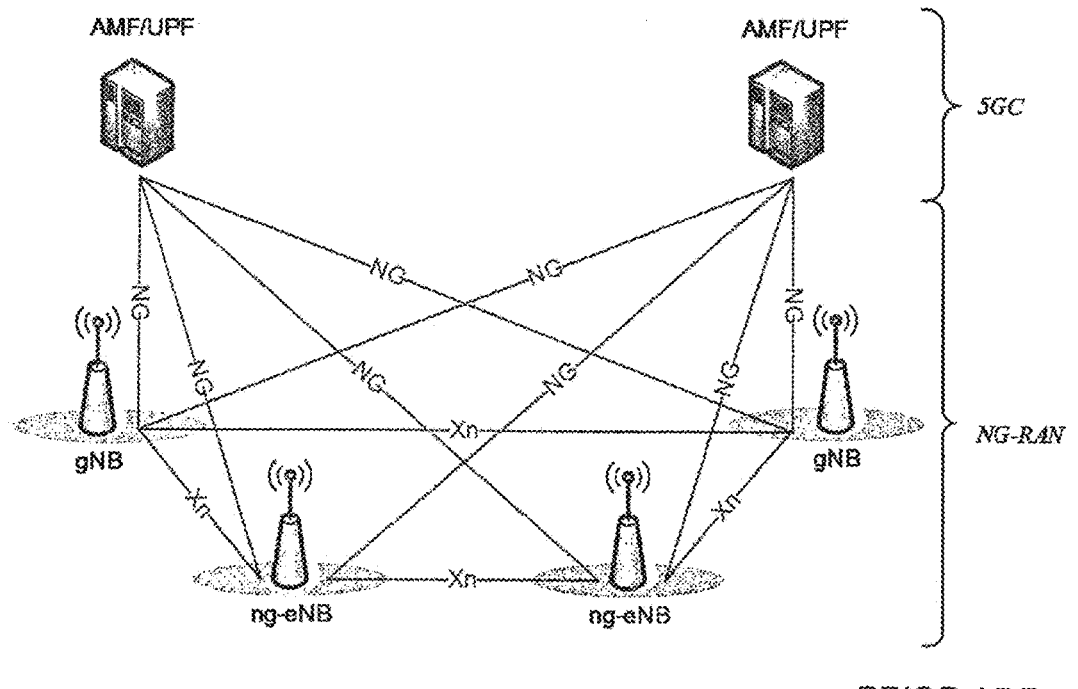
FIG. 20 is a diagrammatic view of overall architecture for a 5G New Radio system.

Certain units and functionalities of the systems 100 may be implemented by electronic machinery. For example, electronic machinery may refer to the processor circuitry described herein, such as terminal processor circuitry 290, mobile station relay processor 200, and node processor(s) 424. Moreover, the term "processor circuitry" is not limited to mean one processor, but may include plural processors, with the plural processors operating at one or more sites. Moreover, as used herein the term "server" is not confined to one server unit, but may encompasses plural servers and/or other electronic equipment, and may be co-located at one site or distributed to different sites. With these understandings, FIG. 19 shows an example of electronic machinery, e.g., processor circuitry, as comprising one or more processors 1090, program instruction memory 1092; other memory 1094 (e.g., RAM, cache, etc.); input/output interfaces 1096 and 1097, peripheral interfaces 1098; support circuits 1099; and busses 1400 for communication between the aforementioned units. The processor(s) 1090 may comprise the processor circuitries described herein, for example, terminal processor circuitry 290, node processor circuitry 424, and mobile station relay processor 200.

A memory or register described herein may be depicted by memory 394, or any computer-readable medium, may be one or more of readily available memory such as random access memory (RAM), read only memory (ROM), floppy disk, hard disk, flash memory or any other form of digital storage, local or remote, and is preferably of non-volatile nature, as and such may comprise memory. The support circuits 1099 are coupled to the processors 1090 for supporting the processor in a conventional manner. These circuits include cache, power supplies, clock circuits, input/output circuitry and subsystems, and the like.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Nodes that communicate using the air interface also have suitable radio communications circuitry. Moreover, the technology disclosed herein may additionally be considered to be embodied entirely within any form of computer-readable memory, such as solid-state memory, magnetic disk, or optical disk containing an appropriate set of computer instructions that would cause a processor to carry out the techniques described herein.

Moreover, each functional block or various features of the wireless terminal 30 and Integrated Access and Backhaul (IAB) nodes employed in each of the aforementioned embodiments may be implemented or executed by circuitry, which is typically an integrated circuit or a plurality of integrated circuits. The circuitry designed to execute the functions described in the present specification may comprise a general-purpose processor, a digital signal processor (DSP), an application specific or general application integrated circuit (ASIC), a field programmable gate array (FPGA), or other programmable logic devices, discrete gates or transistor logic, or a discrete hardware component, or a combination thereof. The general-purpose processor may be a microprocessor, or alternatively, the processor may be a conventional processor, a controller, a microcontroller or a state machine. The general-purpose processor or each circuit described above may be configured by a digital circuit or may be configured by an analogue circuit. Further, when a technology of making into an integrated circuit superseding integrated circuits at the present time appears due to advancement of a semiconductor technology, the integrated circuit by this technology is also able to be used.

It will be appreciated that the technology disclosed herein is directed to solving radio communications-centric issues and is necessarily rooted in computer technology and overcomes problems specifically arising in radio communications. Moreover, the technology disclosed herein improves cell selection in a communications system, and may do so by taking neighboring cell relative mobility information into consideration.

The technology disclosed herein encompasses one or more of the following non-limiting, non-exclusive example embodiments and modes:

Example Embodiment 1: A wireless terminal of a cellular telecommunication system, the wireless terminal communicating with an access node via a serving cell, the wireless terminal comprising:

receiver circuitry configured to receive, from the serving cell, at least one message comprising:

an identity of a neighboring cell, and;

neighboring cell relative mobility information indicating mobility state of the neighboring cell relative to the serving cell, and;

processor circuitry configured to perform a cell reselection procedure based on the neighboring cell relative mobility information.

Example Embodiment 2: The wireless terminal of Example Embodiment 1, wherein the mobility state comprises an indication indicating whether the neighboring cell is stationary or mobile relative to the serving cell.

Example Embodiment 3: The wireless terminal of Example Embodiment 12, wherein the neighboring cell is mobile relative to the serving cell in a case that at least one transmission and reception point (TRP) for the neighboring cell moves relative to at least one TRP for the serving cell.

Example Embodiment 4: The wireless terminal of Example Embodiment 2, wherein the neighboring cell is stationary relative to the serving cell in a case that at least one transmission and reception point (TRP) for the neighboring cell does not move relative to at least one TRP for the serving cell.

Example Embodiment 5: The wireless terminal of Example Embodiment 1, wherein the mobility state comprises a relative speed.

Example Embodiment 6: The wireless terminal of Example Embodiment 1, wherein the neighboring cell relative mobility information is included in a broadcasted signal(s).

Example Embodiment 7: The wireless terminal of Example Embodiment 6, wherein the neighboring cell relative mobility information is included in a master information block (MIB).

Example Embodiment 8: The wireless terminal of Example Embodiment 6, wherein the neighboring cell relative mobility information is included in one or more system information blocks (SIBs).

Example Embodiment 9: The wireless terminal of Example Embodiment 6, wherein the neighboring cell relative mobility information is included in the broadcasted signal(s) in a case that both the serving cell and the neighboring cell geographically move.

Example Embodiment 10: The wireless terminal of Example Embodiment 2, wherein a first set of cell reselection parameters is used during the cell reselection procedure for the neighboring cell, in a case that the indication indicates that the neighboring cell is stationary relative to the serving cell.

Example Embodiment 11: The wireless terminal of Example Embodiment 10, wherein the first set of cell reselection parameters comprises a first cell reselection timer configuration.

Example Embodiment 12: The wireless terminal of Example Embodiment 10, wherein the first set of cell reselection parameters comprises a threshold(s)/offset value(s).

Example Embodiment 13: The wireless terminal of Example Embodiment 10, wherein the first set of cell reselection parameters is pre-determined.

Example Embodiment 14: The wireless terminal of Example Embodiment 10, wherein the first set of cell reselection parameters is pre-configured to the wireless terminal.

Example Embodiment 15: The wireless terminal of Example Embodiment 10, wherein the first set of cell reselection parameters is configured by the access node.

Example Embodiment 16: The wireless terminal of Example Embodiment 2, wherein a second set of cell reselection parameters is used during the cell reselection procedure for the neighboring cell, in a case that the indication indicates that the neighboring cell is mobile relative to the serving cell.

Example Embodiment 17: The wireless terminal of Example Embodiment 16, wherein the second set of cell reselection parameters comprises a first cell reselection timer configuration.

Example Embodiment 18: The wireless terminal of Example Embodiment 16, wherein the second set of cell reselection parameters comprises a threshold(s)/offset value(s).

Example Embodiment 19: The wireless terminal of Example Embodiment 16, wherein the second set of cell reselection parameters is pre-determined.

Example Embodiment 20: The wireless terminal of Example Embodiment 16, wherein the second set of cell reselection parameters is pre-configured to the wireless terminal.

Example Embodiment 21: The wireless terminal of Example Embodiment 16, wherein the second set of cell reselection parameters is configured by the access node.

Example Embodiment 22: An access node of a cellular telecommunication system, the access node serving a wireless terminal via a serving cell, the access node comprising:

processor circuitry configured to generate at least one message comprising: an identity of a neighboring cell, and;

neighboring cell relative mobility information indicating mobility state of the neighboring cell relative to the serving cell, and;

transmitter circuitry configured to transmit, from the serving cell, to the wireless terminal, the message, wherein;

the neighboring cell relative mobility information is used by the wireless terminal to perform a cell reselection procedure.

Example Embodiment 23: The access node of Example Embodiment 22, wherein the mobility state comprises an indication indicating whether the neighboring cell is stationary or mobile relative to the serving cell.

Example Embodiment 24: The access node of Example Embodiment 23, wherein the neighboring cell is mobile relative to the serving cell in a case that at least one transmission and reception point (TRP) for the neighboring cell moves relative to at least one TRP for the serving cell.

Example Embodiment 25: The access node of Example Embodiment 23, wherein the neighboring cell is stationary relative to the serving cell in a case that at least one transmission and reception point (TRP) for the neighboring cell does not move relative to at least one TRP for the serving cell.

Example Embodiment 26: The access node of Example Embodiment 22, wherein the mobility state comprises a relative speed.

Example Embodiment 27: The access node of Example Embodiment 22, wherein the neighboring cell relative mobility information is included in a broadcasted signal(s).

Example Embodiment 28: The access node of Example Embodiment 27, wherein the neighboring cell relative mobility information is included in a master information block (MIB).

Example Embodiment 29: The access node of Example Embodiment 27, wherein the neighboring cell relative mobility information is included in one or more system information blocks (SIBs).

Example Embodiment 30: The access node of Example Embodiment 27, wherein the neighboring cell relative mobility information is included in the broadcasted signal(s) in a case that both the serving cell and the neighboring cell geographically move.

Example Embodiment 31: The access node of Example Embodiment 23, wherein a first set of cell reselection parameters is used during the cell reselection procedure for the neighboring cell, in a case that the indication indicates that the neighboring cell is stationary relative to the serving cell.

Example Embodiment 32: The access node of Example Embodiment 31, wherein the first set of cell reselection parameters comprises a first cell reselection timer configuration.

Example Embodiment 33: The access node of Example Embodiment 31, wherein the first set of cell reselection parameters comprises a threshold(s)/offset value(s).

Example Embodiment 34: The access node of Example Embodiment 31, wherein the first set of cell reselection parameters is pre-determined.

Example Embodiment 35: The access node of Example Embodiment 31, wherein the first set of cell reselection parameters is pre-configured to the wireless terminal.

Example Embodiment 36: The access node of Example Embodiment 31, wherein the first set of cell reselection parameters is configured by the access node.

Example Embodiment 37: The access node of Example Embodiment 23, wherein a second set of cell reselection parameters is used during the cell reselection procedure for the neighboring cell, in a case that the indication indicates that the neighboring cell is mobile relative to the serving cell.

Example Embodiment 38: The access node of Example Embodiment 37, wherein the second set of cell reselection parameters comprises a first cell reselection timer configuration.

Example Embodiment 39: The access node of Example Embodiment 38, wherein the second set of cell reselection parameters comprises a threshold(s)/offset value(s).

Example Embodiment 40: The access node of Example Embodiment 38, wherein the second set of cell reselection parameters is pre-determined.

Example Embodiment 41: The access node of Example Embodiment 38, wherein the second set of cell reselection parameters is pre-configured to the wireless terminal.

Example Embodiment 42: The access node of Example Embodiment 38, wherein the second set of cell reselection parameters is configured by the access node.

Example Embodiment 43: A method for a wireless terminal of a cellular telecommunication system, the wireless terminal communicating with an access node via a serving cell, the method comprising:

receiving, from the serving cell, at least one message comprising: an identity of a neighboring cell, and;

neighboring cell relative mobility information indicating mobility state of the neighboring cell relative to the serving cell, and;

performing a cell reselection procedure based on the neighboring cell relative mobility information.

Example Embodiment 44: The method of Example Embodiment 43, wherein the mobility state comprises an indication indicating whether the neighboring cell is stationary or mobile relative to the serving cell.

Example Embodiment 45: The method of Example Embodiment 44, wherein the neighboring cell is mobile relative to the serving cell in a case that at least one transmission and reception point (TRP) for the neighboring cell moves relative to at least one TRP for the serving cell.

Example Embodiment 46: The method of Example Embodiment 44, wherein the neighboring cell is stationary relative to the serving cell in a case that at least one transmission and reception point (TRP) for the neighboring cell does not move relative to at least one TRP for the serving cell.

Example Embodiment 47: The method of Example Embodiment 43, wherein the mobility state comprises a relative speed.

Example Embodiment 48: The method of Example Embodiment 43, wherein the neighboring cell relative mobility information is included in a broadcasted signal(s).

Example Embodiment 49: The method of Example Embodiment 48, wherein the neighboring cell relative mobility information is included in a master information block (MIB).

Example Embodiment 50: The method of Example Embodiment 48, wherein the neighboring cell relative mobility information is included in one or more system information blocks (SIBs).

Example Embodiment 51: The method of Example Embodiment 48, wherein the neighboring cell relative mobility information is included in the broadcasted signal(s) in a case that both the serving cell and the neighboring cell geographically move.

Example Embodiment 52: The method of Example Embodiment 44, wherein a first set of cell reselection parameters is used during the cell reselection procedure for the neighboring cell, in a case that the indication indicates that the neighboring cell is stationary relative to the serving cell.

Example Embodiment 53: The method of Example Embodiment 52, wherein the first set of cell reselection parameters comprises a first cell reselection timer configuration.

Example Embodiment 54: The method of Example Embodiment 52, wherein the first set of cell reselection parameters comprises a threshold(s)/offset value(s).

Example Embodiment 55: The method of Example Embodiment 52, wherein the first set of cell reselection parameters is pre-determined.

Example Embodiment 56: The method of Example Embodiment 52, wherein the first set of cell reselection parameters is pre-configured to the wireless terminal.

Example Embodiment 57: The method of Example Embodiment 52, wherein the first set of cell reselection parameters is configured by the access node.

Example Embodiment 58: The method of Example Embodiment 44, wherein a second set of cell reselection parameters is used during the cell reselection procedure for the neighboring cell, in a case that the indication indicates that the neighboring cell is mobile relative to the serving cell.

Example Embodiment 59: The method of Example Embodiment 58, wherein the second set of cell reselection parameters comprises a first cell reselection timer configuration.

Example Embodiment 60: The method of Example Embodiment 58, wherein the second set of cell reselection parameters comprises a threshold(s)/offset value(s).

Example Embodiment 61: The method of Example Embodiment 58, wherein the second set of cell reselection parameters is pre-determined.

Example Embodiment 62: The method of Example Embodiment 58, wherein the second set of cell reselection parameters is pre-configured to the wireless terminal.

Example Embodiment 63: The method of Example Embodiment 58, wherein the second set of cell reselection parameters is configured by the access node.

Example Embodiment 64: A method for an access node of a cellular telecommunication system, the access node serving a wireless terminal via a serving cell, the method comprising:

generating at least one message comprising:

an identity of a neighboring cell, and;

neighboring cell relative mobility information indicating mobility state of the neighboring cell relative to the serving cell, and;

transmitting, from the serving cell, to the wireless terminal, the message, wherein;

the neighboring cell relative mobility information is used by the wireless terminal to perform a cell reselection procedure.

Example Embodiment 65: The method of Example Embodiment 64, wherein the mobility state comprises an indication indicating whether the neighboring cell is stationary or mobile relative to the serving cell.

Example Embodiment 66: The method of Example Embodiment 65, wherein the neighboring cell is mobile relative to the serving cell in a case that at least one transmission and reception point (TRP) for the neighboring cell moves relative to at least one TRP for the serving cell.

Example Embodiment 67: The method of Example Embodiment 65, wherein the neighboring cell is stationary relative to the serving cell in a case that at least one transmission and reception point (TRP) for the neighboring cell does not move relative to at least one TRP for the serving cell.

Example Embodiment 68: The method of Example Embodiment 64, wherein the mobility state comprises a relative speed.

Example Embodiment 69: The method of Example Embodiment 64, wherein the neighboring cell relative mobility information is included in a broadcasted signal(s).

Example Embodiment 70: The method of Example Embodiment 69, wherein the neighboring cell relative mobility information is included in a master information block (MIB).

Example Embodiment 71: The method of Example Embodiment 69, wherein the neighboring cell relative mobility information is included in one or more system information blocks (SIBs).

Example Embodiment 72: The method of Example Embodiment 69, wherein the neighboring cell relative mobility information is included in the broadcasted signal(s) in a case that both the serving cell and the neighboring cell geographically move.

Example Embodiment 73: The method of Example Embodiment 65, wherein a first set of cell reselection parameters is used during the cell reselection procedure for the neighboring cell, in a case that the indication indicates that the neighboring cell is stationary relative to the serving cell.

Example Embodiment 74: The method of Example Embodiment 73, wherein the first set of cell reselection parameters comprises a first cell reselection timer configuration.

Example Embodiment 75: The method of Example Embodiment 73, wherein the first set of cell reselection parameters comprises a threshold(s)/offset value(s).

Example Embodiment 76: The method of Example Embodiment 73, wherein the first set of cell reselection parameters is pre-determined.

Example Embodiment 77: The method of Example Embodiment 73, wherein the first set of cell reselection parameters is pre-configured to the wireless terminal.

Example Embodiment 78: The method of Example Embodiment 73, wherein the first set of cell reselection parameters is configured by the access node.

Example Embodiment 79: The method of Example Embodiment 65, wherein a second set of cell reselection parameters is used during the cell reselection procedure for the neighboring cell, in a case that the indication indicates that the neighboring cell is mobile relative to the serving cell.

Example Embodiment 80: The method of Example Embodiment 79, wherein the second set of cell reselection parameters comprises a first cell reselection timer configuration.

Example Embodiment 81: The method of Example Embodiment 79, wherein the second set of cell reselection parameters comprises a threshold(s)/offset value(s).

Example Embodiment 82: The method of Example Embodiment 79, wherein the second set of cell reselection parameters is pre-determined.

Example Embodiment 88: The method of Example Embodiment 79, wherein the second set of cell reselection parameters is pre-configured to the wireless terminal.

Example Embodiment 84: The method of Example Embodiment 79, wherein the second set of cell reselection parameters is configured by the access node.

One or more of the following 3GPP SA1 #92-e documents may be pertinent to the technology disclosed herein (all of which are incorporated herein by reference in their entirety):

| S1-204109 | Use Case: Optimizing mobility for UEs, LG Electronics Inc., Qualcomm Incorporated |
| S1-204110 | Use Case: VMR load balancing, LG Electronics Inc., Qualcomm Incorporated |
| S1-204149 | Use case for multiple working modes of vehicle mounted base station CATT |
| S1-204150 | Use case for continuous connection via bus mounted base station CATT |
| S1-204151 | Use case for authorization and configuration for car mounted base station CATT |
| S1-204176 | FS_VMR-Use Case-Provide Location service to a UE attached to the relay mounted in the vehicle Beijing Xiaomi Electronics |
| S1-204220 | TR scope Qualcomm Incorporated |
| S1-204221 | Text proposal for Overview section Qualcomm Incorporated |
| S1-204222 | Use case: support of relay operation, activation and basic configuration Qualcomm Incorporated |
| S1-204223 | Use case: access control, permission and policies Qualcomm Incorporated |
| S1-204235 | Use case: access control, app based user authorization Qualcomm Incorporated |
| S1-204236 | Use case: mobility between macro and relay - user outside vehicle Qualcomm Incorporated |
| S1-204237 | Use case: mobility between macro and relay, user entering-leaving vehicle Qualcomm Incorporated |
| S1-204238 | Use case: mobility between relays, user outside vehicle Qualcomm Incorporated |
| S1-204239 | Use case: mobility between relays, user inside vehicle Qualcomm Incorporated |
| S1-204240 | Use case: mobility of relay between macro, user outside vehicle Qualcomm Incorporated |
| S1-204241 | Use case: mobility of relay between macro, user inside vehicle Qualcomm Incorporated |
| S1-204242 | Use case: incentives and charging Qualcomm Incorporated |
| S1-204243 | Draft TP for section on Other considerations Qualcomm Incorporated |
| S1-204244 | TR skeleton Qualcomm Incorporated |

One or more of the following patent documents may be pertinent to the technology disclosed herein (all of which are incorporated herein by reference in their entirety):

U.S. Pat. No. 9,924,439

JP4730565

CN104796961

EP2708063

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." The above-described embodiments could be combined with one another. All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims.

CROSS REFERENCE

This Nonprovisional application claims priority under 35 U.S.C. § 119 on provisional Application Ser. No. 63/147,446 on Feb. 9, 2021, the entire contents of which are hereby incorporated by reference.

What is claimed is:

What is claimed is:

1. A wireless terminal of a cellular telecommunication system, the wireless terminal communicating with an access node via a serving cell, the wireless terminal comprising:
   receiver circuitry configured to receive, from the serving cell, at least one message comprising:
      an identity of a neighboring cell,
      neighboring cell relative mobility information indicating a mobility state of the neighboring cell relative to the serving cell, and
      a plurality of cell reselection parameter sets; and
   processor circuitry configured to:
      select, based on the neighboring cell relative mobility information, a cell reselection parameter set from the plurality of cell reselection parameter sets, and
      perform a cell reselection procedure using the selected cell reselection parameter set, wherein
         the plurality of cell reselection parameter sets is used to differentiate a likelihood of reselecting the neighboring cell based on the mobility state of the neighboring cell relative to the serving cell.

2. The wireless terminal of claim 1, wherein the mobility state comprises an indication indicating whether the neighboring cell is stationary or mobile relative to the serving cell.

3. The wireless terminal of claim 2, wherein the neighboring cell is mobile relative to the serving cell in a case that at least one transmission and reception point (TRP) for the neighboring cell moves relative to at least one TRP for the serving cell.

4. The wireless terminal of claim 2, wherein the neighboring cell is stationary relative to the serving cell in a case that at least one transmission and reception point (TRP) for the neighboring cell does not move relative to at least one TRP for the serving cell.

5. The wireless terminal of claim 2, wherein a first parameter set of the plurality of cell reselection parameter sets is used during the cell reselection procedure for the neighboring cell in a case that the indication indicates that the neighboring cell is stationary relative to the serving cell.

6. The wireless terminal of claim 5, wherein a second parameter set of the plurality of cell reselection parameter sets is used during the cell reselection procedure for the neighboring cell in a case that the indication indicates that the neighboring cell is mobile relative to the serving cell.

7. The wireless terminal of claim 1, wherein the neighboring cell relative mobility information is included in one or more system information blocks (SIBs).

8. An access node of a cellular telecommunication system, the access node serving a wireless terminal via a serving cell, the access node comprising:
   processor circuitry configured to generate at least one message comprising:
      an identity of a neighboring cell,
      neighboring cell relative mobility information indicating a mobility state of the neighboring cell relative to the serving cell, and
      a plurality of cell reselection parameter sets; and
   transmitter circuitry configured to transmit, from the serving cell to the wireless terminal, the message, wherein;
      the neighboring cell relative mobility information is used by the wireless terminal to perform a cell reselection procedure, and
      the plurality of cell reselection parameter sets is used by the wireless terminal to differentiate a likelihood of reselecting the neighboring cell based on the mobility state of the neighboring cell relative to the serving cell.

9. The access node of claim 8, wherein the mobility state comprises an indication indicating whether the neighboring cell is stationary or mobile relative to the serving cell.

10. The access node of claim 9, wherein the neighboring cell is mobile relative to the serving cell in a case that at least one transmission and reception point (TRP) for the neighboring cell moves relative to at least one TRP for the serving cell.

11. The access node of claim 9, wherein the neighboring cell is stationary relative to the serving cell in a case that at least one transmission and reception point (TRP) for the neighboring cell does not move relative to at least one TRP for the serving cell.

12. The access node of claim 9, wherein a first parameter set of the plurality of cell reselection parameter sets is used during the cell reselection procedure for the neighboring cell in a case that the indication indicates that the neighboring cell is stationary relative to the serving cell.

13. The access node of claim 12, wherein a second parameter set of the plurality of cell reselection parameter sets is used during the cell reselection procedure for the neighboring cell in a case that the indication indicates that the neighboring cell is mobile relative to the serving cell.

14. The access node of claim 8, wherein the neighboring cell relative mobility information is included in one or more system information blocks (SIBs).

15. A method performed by a wireless terminal of a cellular telecommunication system, the wireless terminal communicating with an access node via a serving cell, the method comprising:
   receiving, from the serving cell, at least one message comprising:
      an identity of a neighboring cell,
      neighboring cell relative mobility information indicating a mobility state of the neighboring cell relative to the serving cell, and
      a plurality of cell reselection parameter sets;
   selecting, based on the neighboring cell relative mobility information, a cell reselection parameter set from the plurality of cell reselection parameter sets; and performing a cell reselection procedure using the selected
cell reselection parameter set, wherein
the plurality of cell reselection parameter sets is used to
differentiate a likelihood of reselecting the neighbor-
ing cell based on the mobility state of the neighbor-
ing cell relative to the serving cell.

* * * * *